United States Patent
Moghe et al.

(10) Patent No.: US 12,212,140 B2
(45) Date of Patent: Jan. 28, 2025

(54) SYSTEM AND METHOD FOR DETERMINING A LOCAL CONSERVATIVE VOLTAGE REDUCTION CVR FACTOR

(71) Applicant: Sentient Energy Technology, LLC, Wichita, KS (US)

(72) Inventors: Rohit Moghe, Wichita, KS (US); Hong Chun, Wichita, KS (US)

(73) Assignee: SENTIENT ENERGY TECHNOLOGY, LLC, Wichita, KS (US)

( * ) Notice: Subject to any disclaimer, the term of this patent is extended or adjusted under 35 U.S.C. 154(b) by 422 days.

(21) Appl. No.: 17/581,830

(22) Filed: Jan. 21, 2022

(65) Prior Publication Data

US 2022/0239103 A1  Jul. 28, 2022

Related U.S. Application Data

(60) Provisional application No. 63/140,719, filed on Jan. 22, 2021.

(51) Int. Cl.
*H02J 3/16* (2006.01)
*H02J 3/18* (2006.01)

(52) U.S. Cl.
CPC .............. *H02J 3/16* (2013.01); *H02J 3/1828* (2013.01)

(58) Field of Classification Search
CPC .................................. H02J 3/16; H02J 3/1828
See application file for complete search history.

(56) References Cited

U.S. PATENT DOCUMENTS

| 10,541,533 | B2 | 1/2020 | Divan et al. | |
|---|---|---|---|---|
| 2012/0197450 | A1* | 8/2012 | Krok | H02J 3/16 700/291 |
| 2014/0039712 | A1* | 2/2014 | Bell | H02J 3/16 700/291 |

(Continued)

OTHER PUBLICATIONS

Hossein, Z. "Conservation Voltage Reduction and Volt-VAR Optimization: Measurement and Verification Benchmarking", 2020, IEEE Power & Energy Society Section, vol. 8, URL: <https://ieeexplore.ieee.org/document/9027815> (Year: 2020).*

(Continued)

*Primary Examiner* — Kenneth M Lo
*Assistant Examiner* — Jonathan Michael Skrzycki
(74) *Attorney, Agent, or Firm* — Perilla Knox & Hildebrandt LLP; Thomas B. Hildebrandt

(57) ABSTRACT

A system and method for determining a local CVR factor using grid edge devices (GEDs) comprises: receiving, from each of the GEDs, respective voltage change values and power change values; identifying, using the processor, voltage events within at least one control zone, each of the GEDs being associated with a zone of the at least one control zone, the voltage events being identified based on the GEDs in the groups meeting one or more event parameters; identifying a plurality of CVR values for each GED, each CVR value being based on one of the voltage change values and one of the power change values associated with each identified voltage event; generating, using the processor and based on the plurality of CVR values, a local CVR factor for each GED; and, controlling one or more devices based on the local CVR factor.

20 Claims, 38 Drawing Sheets

(56) References Cited

U.S. PATENT DOCUMENTS

| | | | | |
|---|---|---|---|---|
| 2014/0172503 A1* | 6/2014 | Hammerstrom | ....... | G05B 15/02 |
| | | | | 705/7.31 |
| 2014/0258787 A1* | 9/2014 | Edrich | ................ | G06F 11/0706 |
| | | | | 714/47.2 |
| 2014/0277814 A1* | 9/2014 | Hall | .................. | H02J 13/00026 |
| | | | | 700/298 |
| 2017/0060161 A1* | 3/2017 | Tyler | .................... | G05B 19/042 |
| 2020/0371539 A1* | 11/2020 | Powell | .............. | H02J 13/00006 |

OTHER PUBLICATIONS

Singh, S. "Event-Driven Predictive Approach for Real-Time Volt/VAR Control With CVR in Solar PV Rich Active Distribution Network" Sep. 2021, IEEE Transactions on Power Systems, vol. 36, No. 5 URL:<https://ieeexplore.ieee.org/document/9350202>(Year: 2021).*

Singh, S. "Real-Time Conservation Voltage Reduction and Control in Smart Micro-Grid Application" 2020, 2020 IEEE International Conference on Power Electronics, Drives and Energy Systems (PEDES) URL: < https://ieeexplore.ieee.org/document/9379558> (Year: 2020).*

Jayamaran, S. "Reducing Energy Consumption in Industrial Plants Using Behind the Meter Conservation Voltage Reduction", 2018, 2018 IEEE Energy Conversion Congress and Exposition (ECCE), URL:<https://ieeexplore.ieee.org/document/8558461>(Year: 2018).*

* cited by examiner

SYSTEM AND METHOD FOR DETERMINING A LOCAL CONSERVATIVE VOLTAGE REDUCTION CVR FACTOR

CROSS-REFERENCE TO RELATED APPLICATION

This Patent application claims priority to U.S. Patent Application No. 63/140,719, filed on Jan. 22, 2021. The disclosure of the prior Application is considered part of and is incorporated by reference into this Patent Application.

BACKGROUND

Various embodiments generally relate to estimating a local conservative voltage reduction (CVR) factor. For example, various embodiments are related to estimating a local CVR factor using grid edge devices (GEDs).

SUMMARY OF THE EMBODIMENTS

In some implementations, a computer—implemented method for determining a local CVR factor using grid edge devices (GEDs) includes receiving, from each of the GEDs, respective voltage change values and power change values; identifying, using the processor, voltage events within at least one control zone, each of the GEDs being associated with a zone of the at least one control zone, the voltage events being identified based on the GEDs in the groups meeting one or more event parameters; identifying a plurality of CVR values for each GED, each CVR value being based on one of the voltage change values and one of the power change values associated with each identified voltage event; generating, using the processor and based on the plurality of CVR values, a local CVR factor for each GED; and, controlling one or more devices based on the local CVR factor.

In some implementations, a computer-implemented method for estimating a local CVR factor using grid edge devices (GEDs) includes receiving, from each of the GEDs, respective voltage change values and power change values; identifying, using the processor, voltage events within at least one control zone, each of the GEDs being associated with a zone of the at least one control zone, the voltage events being identified based on the GEDs in the groups meeting one or more event parameters; identifying a plurality of CVR values for each GED, each CVR value being based on one of the voltage change values and one of the power change values associated with each identified voltage event; when a number of events meets or exceeds an optimal window size, generating, using the processor and based on the plurality of CVR values, a local CVR factor for each GED; and, controlling one or more devices based on the local CVR factor.

In some implementations, a computer-implemented method for determining a local CVR factor using grid edge devices (GEDs) includes receiving, from each of the GEDs, respective voltage change values and power change values; identifying, using the processor, voltage events within at least one control zone, each of the GEDs being associated with a zone of the at least one control zone, the voltage events being identified based on the GEDs in the groups meeting one or more event parameters; identifying a plurality of CVR values for each GED, each CVR value being based on one of the voltage change values and one of the power change values associated with each identified voltage event; identifying a plurality of moving median CVR factors for each GED based on the plurality of CVR values, generating, using the processor and based on the moving median CVR factors, a local CVR factor for each GED; and, controlling one or more devices based on the local CVR factor.

BRIEF DESCRIPTION OF THE FIGURES

The present disclosure, in accordance with one or more various embodiments, is described in detail with reference to the following figures. The figures are provided for purposes of illustration and merely depict typical or example embodiments.

The figures are not exhaustive and do not limit the present disclosure to the precise form disclosed.

DETAILED DESCRIPTION OF THE EMBODIMENTS

Few existing methodologies look at CVR factor for power and instead focus on CVR factor for energy. CVR factor may refer to the percentage power change caused by a one percent change in voltage. Existing methodologies include a sister substations methodology where the CVR factor, sometimes referred to herein as CVR, is implemented on a substation (control group) with similar operating conditions to another substation (test case) and comparing the results to the test case. Another methodology uses a same substation on/off CVR methodology. This may rely by implementing CVR ON and CVR OFF on alternate days for a few days on the same substation (test case) and comparing the difference, which may include eliminating outlier days such as holidays, etc. Another methodology may run CVR day ON/OFF for at least 1 year. A CVR is calculated based on the assumption that a linear load model has a linear dependence on voltage and asymmetric linear relationships with temperature and stochastic components representing random load behaviors. None of the above-discussed methodologies effectively address CVR factor for power or address other issues with these existing methodologies. The potential US energy savings from understanding CVR are as high as 6500 MWyears or 56.9 TWh.

The presently disclosed technology discloses estimating a local CVR factor that may provide useful information to other systems, may allow users to understand load characteristics behind the service transformer, may be used to estimate a system level CVR factor using local CVR factors gathered from different areas in the network, and may be used to calculate the peak demand reduction (kW) at the service transformer level (i.e., for commercial and industrial loads).

Figure 1:
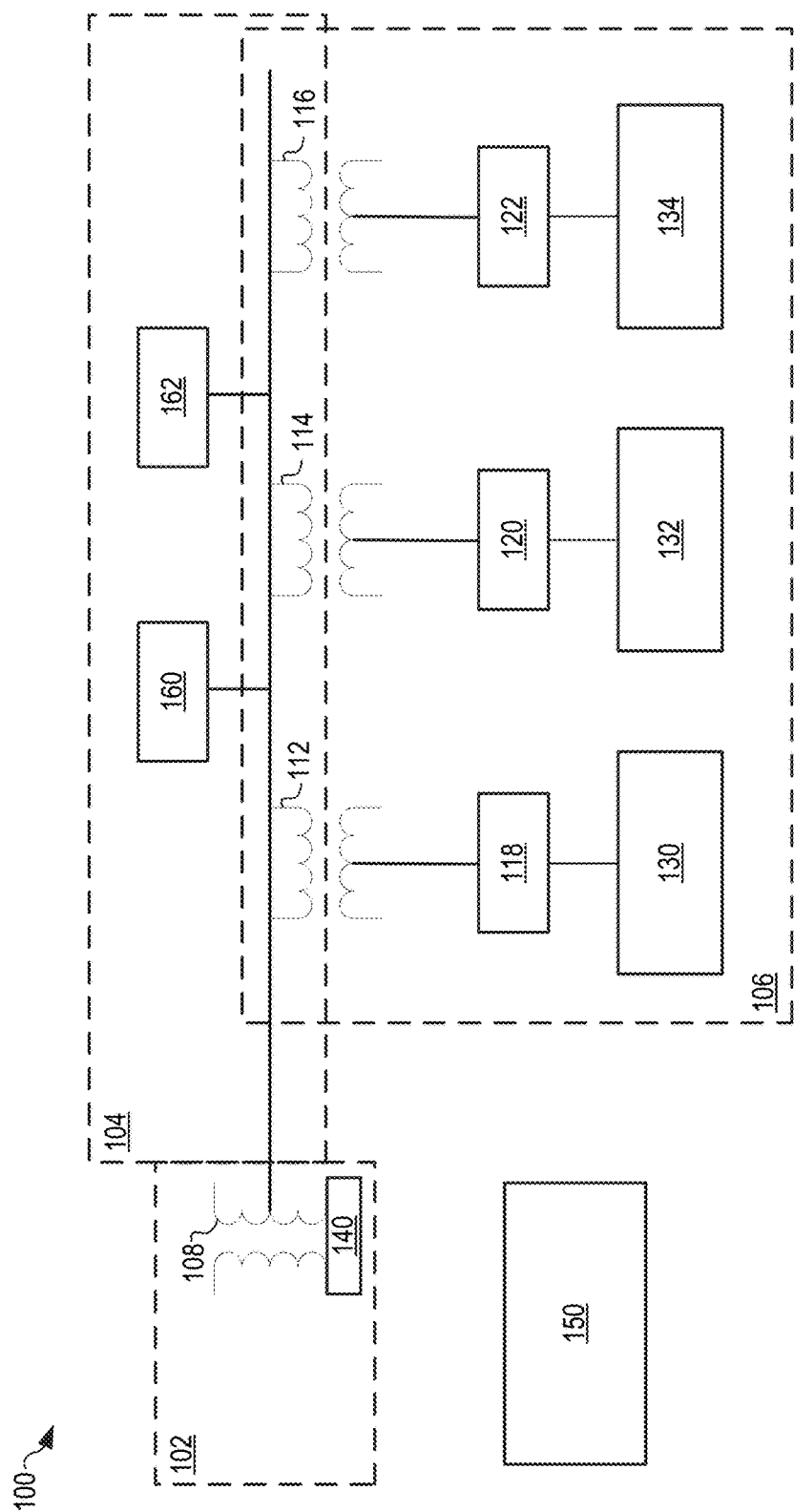
FIG. 1 is a diagram of an example power system with multiple GEDs, in accordance with various embodiments of the present disclosure.

FIG. 1 illustrates example power system 100, or a network, that is utilizing voltage and VAR control. In the illustrated example, the power system 100 may include substation zone 102, regional zone 104, and local zone 106. Individual zones may have multiple loads. Each load may have a corresponding CVR factor. These load-specific CVR factors may be used to estimate a CVR factor for a zone, which, in turn, may be used to estimate a CVR factor for the network. Substation zone 102 may step down voltage using a transformer 108 to the regional zone 104. Regional zone 104 may include a primary side of service transformers 112, 114, and 116. Service transformers 112, 114, and 116 may step down the voltage again, to be ready for consumer usage in local zone 106, on the secondary side of service transformers 112, 114, and 116. Local zone 106 may include GEDs 118, 120, and 122 servicing consumers 130, 132, and 134, respectively, with corresponding consumer loads that may be highly variable and stochastic.

The number of elements (e.g., transformers, regional zones, local zones, GEDs, customers, and any other component or device) is illustrative. More or fewer of each element may be included without departing from the scope hereof.

The substation transformer 108 may be controlled by one or more load tap changers (LTCs) 140 that regulate the output voltage of the substation transformer 108 to provide voltage control to regional zone 104. Voltage, current, and power flows may be measured and fed to one or more supervisory control and data acquisition (SCADA) systems 150. SCADA system 150 may be in operational communication with any one or more of the devices shown in system 100, or other devices that are a component of network 100 as known in the art.

Regional zone 104 may include switched capacitor banks 160 that are used for VAR control. The control provided by the switched capacitor banks may be slow and "lumpy." For example, the switched capacitor banks may be switched two to three times a day. Further, the response time of a capacitor bank 160 can be on the order of several seconds to minutes. The regional zone 104 may additionally contain line voltage regulators (LVRs) 162 for voltage control. The location and number of switched capacitor banks 160 and LVRs 162 shown in FIG. 1 are illustrative and not limiting herein this disclosure.

The presently disclosed technology includes various embodiments that are directed to systems and methods to estimate the local CVR factor at a service transformer level based on one or more of voltage change values and power change values. For example, GEDs 118, 120, and 122 may be used to obtain voltage values and power values. The power values may include both real and reactive power values. These voltage values and power values may be used to generate voltage change values and power change values, either at the GED or at a remote server.

The GEDs, as illustrated in FIG. 1, may be deployed to an existing power system and may be configured to work with existing LTCs, LVRs, and/or capacitor bank infrastructure, which may provide voltage and VAR optimization. That is, voltage and VAR control may be delivered using GEDs, such as, but not limited to, edge of network grid optimization (ENGO) devices, Grid Edge Management System (GEMS) devices (such as those manufactured by Sentient Energy), smart inverters, smart meters (such as, but not limited to, the MM3™, UM3™, and/or ZM1™ Smart Meters sold by Sentient Energy), electric vehicle chargers, and other VAR sources. Examples of GEDs and/or VAR sources are described in U.S. patent application Ser. No. 14/659,418 entitled "Systems and Methods for Edge of Network Voltage Control of a Power Grid," which is incorporated herein by reference in its entirety.

Grid optimization, such as line loss reduction and peak demand reduction, may be realized. Grid integration, such as distributed PV, load/source dynamics mitigation, may also be realized. Grid support, such as weak node voltage support and reduced momentary impact, may be provided. Further still, various embodiments may provide automatic power factor control at the node and/or feeder level. It should be noted that feeder health may be ensured for various embodiments' visibility to feeder level secondary voltages. Still other embodiments may integrate decentralized control with centralized command. Additionally, it should be appreciated that power systems utilizing voltage and VAR control in accordance with various embodiments may be less susceptible to and/or resilient with respect to unit/device failure.

Figure 2:
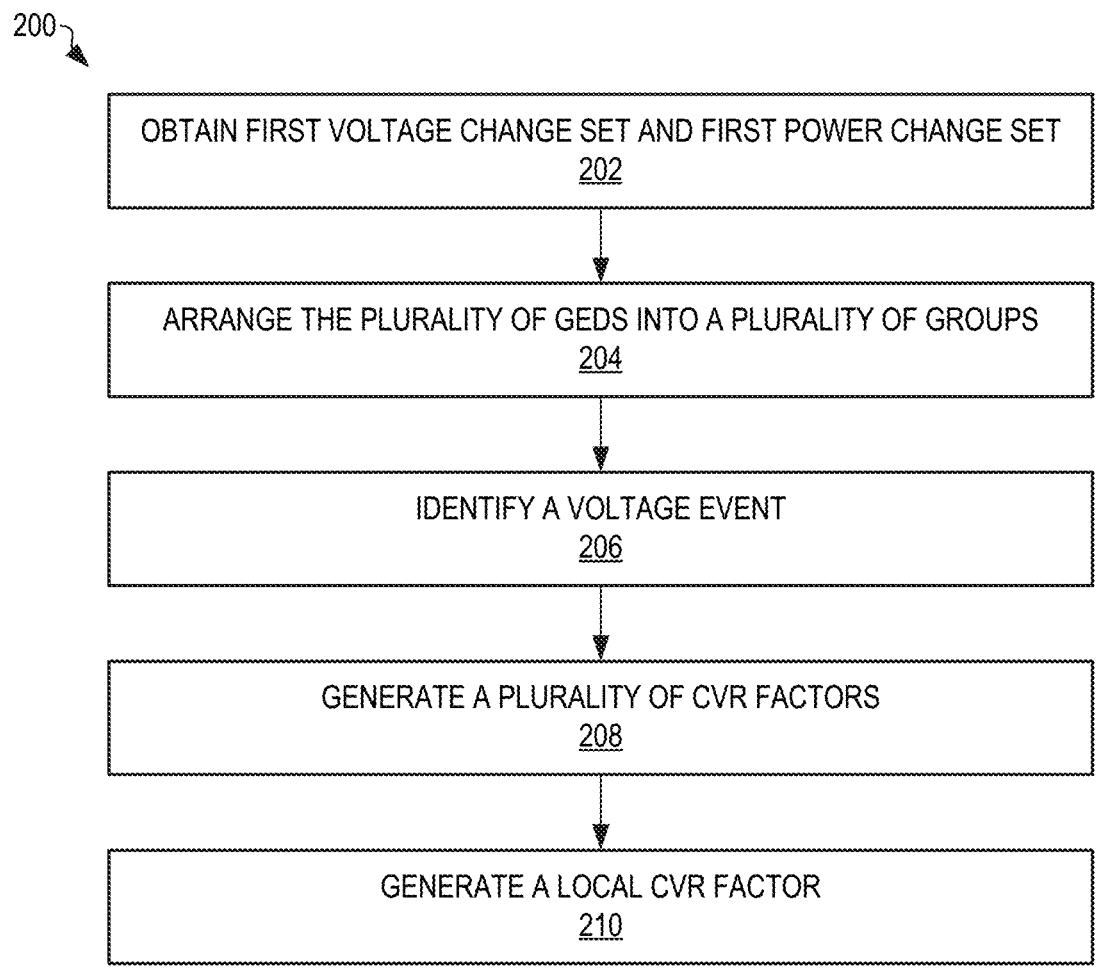
FIG. 2 is an operational flow diagram illustrating an example process for generating a local CVR factor, in accordance with various embodiments of the present disclosure.

FIG. 2 is an operational flow diagram illustrating an example process 200 for generating a local CVR factor, in accordance with various embodiments of the present disclosure. The operations of the various methods described herein are not limited to the order described or shown in the figures, and it should be appreciated, upon studying the present disclosure, that variations of the order of the operations described herein are within the spirit and scope of the disclosure.

The operations and sub-operations of the flow diagrams described herein may be carried out, in some cases, by one or more of the components, elements, devices, components, and circuitry of the presently disclosed system. This may include one or more GEDs and computing component 3800, described herein and referenced with respect to at least FIG. 38, as well as subcomponents, elements, devices, components, and circuitry depicted therein and/or described with respect thereto. In such instances, the descriptions of the flow diagrams may refer to a corresponding component, element, etc., but regardless of whether an explicit reference is made, it will be appreciated, upon studying the present disclosure, when the corresponding component, element, etc. may be used. Further, it will be appreciated that such references do not limit the described methods to the particular component, element, etc. referred to. Thus, it will be appreciated that aspects and features described above in connection with (sub-) components, elements, devices, circuitry, etc., including variations thereof, may be applied to the various operations described in connection with the flow diagrams without departing from the scope of the present disclosure.

In one embodiment, process 200 is implemented at SCADA 150. Additionally or alternatively, one or more steps of process 200 may be implemented throughout network 100, such as at one or more smart devices such as, but not limited to, edge of network grid optimization (ENGO) devices, Grid Edge Management System (GEMS) devices (such as those manufactured by Sentient Energy), smart inverters, smart meters (such as, but not limited to, the MM3™, UM3™, and/or ZM1™ Smart Meters sold by Sentient Energy), electric vehicle chargers, and other VAR sources. Examples of GEDs and/or VAR sources are described in U.S. patent application Ser. No. 14/659,418 entitled "Systems and Methods for Edge of Network Voltage Control of a Power Grid," which is incorporated herein by reference in its entirety.

At 202, a first voltage change set and a first power change set may be obtained and/or generated. The first voltage change set may include voltage change values that may be defined by a difference between a previous voltage value and the current voltage value. The first power change set may include power change values that may be defined by a difference between a previous power value and the current power value. As discussed herein, power may refer to one or both of real power and reactive power. In some embodiments, power and voltage measurements may be obtained from the GEDs (such as GEDs 118, 120, 122 of FIG. 1) over a period of time, and the voltage change values and power change values may be generated based on the obtained power and voltage measurements. In some embodiments, the one or more GEDs may be implemented on a secondary side of a distribution line providing electricity for a consumer. The one or more GEDs may include one or more sensors to obtain relevant information (e.g., clock, time of day, temperature sensor, VAR sensor, voltage sensor, current sensor, a sensor for identifying the number of switching operations, etc.).

At 204, the GEDs may be arranged into groups. The groups may be arranged based on a network parameter. In embodiments, the groups may include three or more GEDs. The network parameter may include one or more of a zone in which a GED is located and a phase of power an individual GED is receiving (e.g., Phase A, Phase B, or Phase C). For example, a first group of GEDs may be in a first zone with a LTC. A second group of GEDs may be in a second zone with no LTC; instead, the second group is in an area that has a Phase A power supply. A third group of GEDs may be in the second zone and in an area that has a Phase B power supply. It should be appreciated that these are merely examples of a variety of different network parameters used to group the GEDs, and other network parameters may be used to arrange the GEDs into groups.

At 206, a voltage event may be identified. The voltage event may be identified based on the groups of GEDs meeting event parameters for a given time. For example, by aggregating results of analyzing individual ones of the groups a voltage event may be identified. In one example, the number of GEDs used to identify a voltage event may be greater than six. One of the event parameters indicating a true voltage event may include a number of GEDs in a group having a change in voltage in the same direction. The number of GEDs may be at, or over, a majority of the GEDs in the group (e.g., greater than 50%, greater than 75%, greater than 80%, greater than 85%, greater than 90%, etc. It should be appreciated that, throughout this document, differences between example numbers may be more granular than stated, e.g., the numbers may vary by 1, 0.1, 0.01, etc. even though the numbers listed are separated by 5, 10, 25, etc.). In some embodiments, a percentage below a majority of the GEDs may be sufficient to indicate a true voltage event (e.g., 20%-50%). In embodiments, one of the event parameters indicating a true voltage event may include a number of GEDs having an average change in voltage greater than or equal to a change in a voltage threshold based on the number of GEDs having a positive change in voltage. Another event parameter indicating a true voltage event may include the number of GEDs having an average change in voltage less than or equal to a change in a voltage threshold based on the number of GEDs having a negative change in voltage. In some embodiments, one of the event parameters indicating a true voltage event may include a number of GEDs in a group having a median change in voltage greater than or equal to a change in a voltage threshold based on the number of GEDs having a positive change in voltage. Yet another one of the event parameters indicating a true voltage event may include a number of GEDs in a group having a median change in voltage less than or equal to a change in a voltage threshold based on the number of GEDs having a negative change in voltage. It should be appreciated that one or more event parameters, as well as other event parameters, may be used to identify a true voltage event. In another example, less than six GEDs may be used to identify a voltage event, though all of the GEDs may be used to meet the event parameters.

For example, a first group of GEDs may meet at least one event parameter because all six GEDs had a change in voltage in the same direction at the same time and the average change in voltage of all six GEDs is above a voltage threshold of 0.75V at the same time. This may indicate a true voltage event.

In another example, a second group of GEDs may meet an event parameter because eight out of the ten GEDs had a change in voltage in the same direction at the same time and the average change in voltage of at least the eight GEDs with the highest voltage change values is above a voltage threshold of 0.75V at the same time. This may indicate a true voltage event.

At 208, GED CVR factors may be generated. An individual GED CVR factor may be generated based on the percentage power change and the percentage voltage change for an individual GED. In some embodiments, the GEDs corresponding to the second power change set and the second voltage change set are used to generate the percentage power change and the percentage voltage change. In embodiments, this may be generated at a remote server. In one example, the individual GED CVR factor may be determined by taking the percentage power change and dividing it by the percentage voltage change. The number of GED CVR factors may be greater than a voltage event threshold and/or a CVR threshold. The voltage event threshold may be a number of voltage events used to generate a local CVR factor determined by a window size, as will be discussed herein. The CVR threshold may be a number of median GED CVR factors, or otherwise statistically manipulated GED CVR factors, used to generate a local CVR factor. The CVR threshold may be determined by a moving average size, as will be discussed herein. It should be appreciated that the use of the terms average, median, and mode may be used throughout this document, though other statistical techniques may be used in lieu of the technique stated.

At 210, a local CVR factor may be generated. The local CVR factor may be generated based on the GED CVR factors. In embodiments, the local CVR factor may be based on a voltage event threshold and a CVR threshold.

For example, median GED CVR factors may be generated based on a list of historical GED CVR factors. The GED CVR factors may meet a voltage event threshold. The voltage event threshold may be a minimum number of voltage events. The voltage event threshold may be updated periodically (e.g., every month, every 3 months, every season, every 6 months, every year, etc.). The GED CVR factors may meet a CVR threshold. The CVR threshold may be a minimum number of median GED CVR measurements that will reduce the error derived from the median GED CVR factors. The resulting list of median GED CVR values may be averaged, or otherwise statistically manipulated, to generate the local CVR factor.

Figure 3:
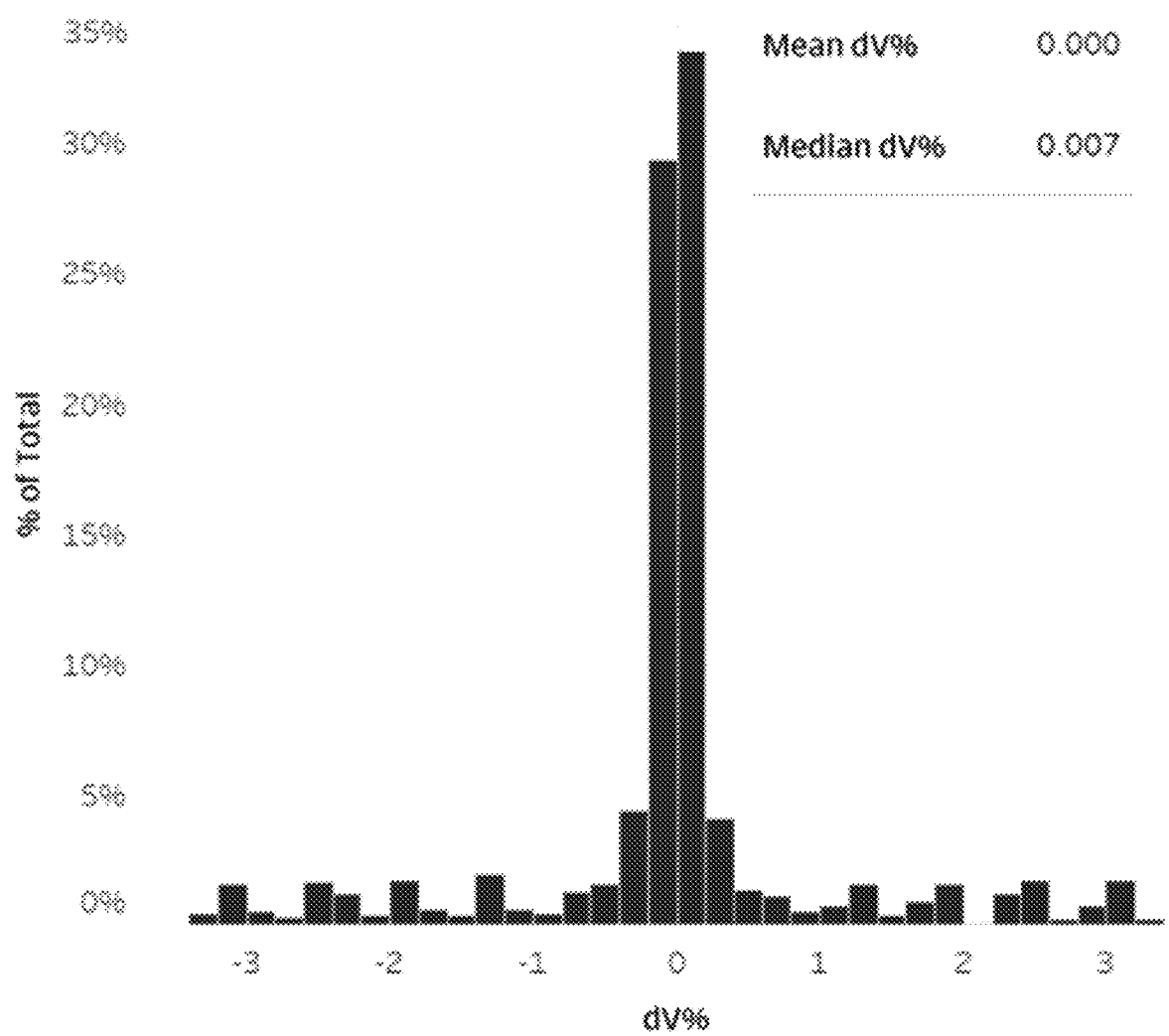
FIG. 3 is a histogram of percentage voltage change, in accordance with various embodiments of the present disclosure.

FIG. 3 is a histogram of percentage voltage change measured in the field at the secondary side of a service transformer, in accordance with various embodiments of the present disclosure. The histogram illustrates that with enough data points (i.e., over about 100), the mean, median, and mode of the percentage power change value of the native load is approximately zero.

Figure 4:
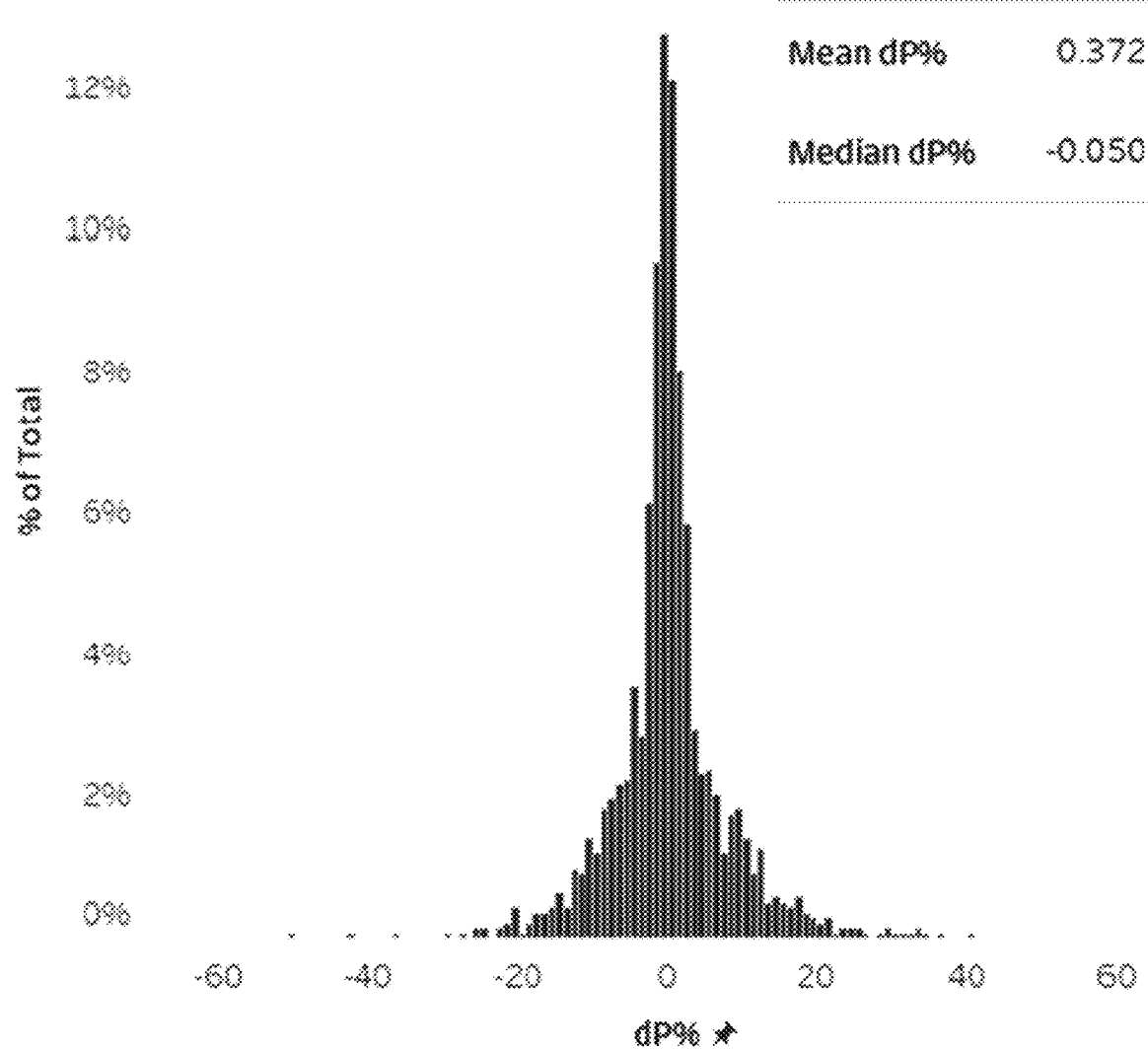
FIG. 4 is a histogram of percentage power change, in accordance with various embodiments of the present disclosure.

FIG. 4 is a histogram of percentage power change measured in the field at the secondary side of a service transformer, in accordance with various embodiments of the present disclosure. The histogram illustrates that with enough data points (i.e., over about 100), the mean, median, and mode of the percentage voltage change value of the native load is approximately zero. Since both the percentage voltage change value and the percentage power change value are about zero with enough data points, the local CVR factor based on voltage events can be determined based on $$\text{local } CVR \text{ factor} = \frac{\Delta P \%_{measured}}{\Delta V \%_{measured}} = \frac{\Delta P \%_{native\ load} + \Delta P \%_{voltage\ events}}{\Delta V \%_{native\ load} + \Delta V \%_{voltage\ events}}$$

where $\Delta P \%_{measured}$ may refer to the measured percentage power change, $\Delta V \%_{measured}$ may refer to the measured percentage voltage change, $\Delta P \%_{native\ load}$ may refer to the percentage power change based on the native load, $\Delta V \%_{native\ load}$ may refer to the percentage voltage change based on the native load, $\Delta P \%_{voltage\ events}$ may refer to percentage power change based on voltage events, and $\Delta V \%_{voltage\ events}$ may refer to percentage voltage change based on voltage events. As more and more data points are aggregated, the $\Delta P \%_{native\ load}$ and $\Delta V \%_{native\ load}$ may approach zero, making it easier to identify the local CVR factor based on percentage power change and percentage voltage change.

Figure 5:
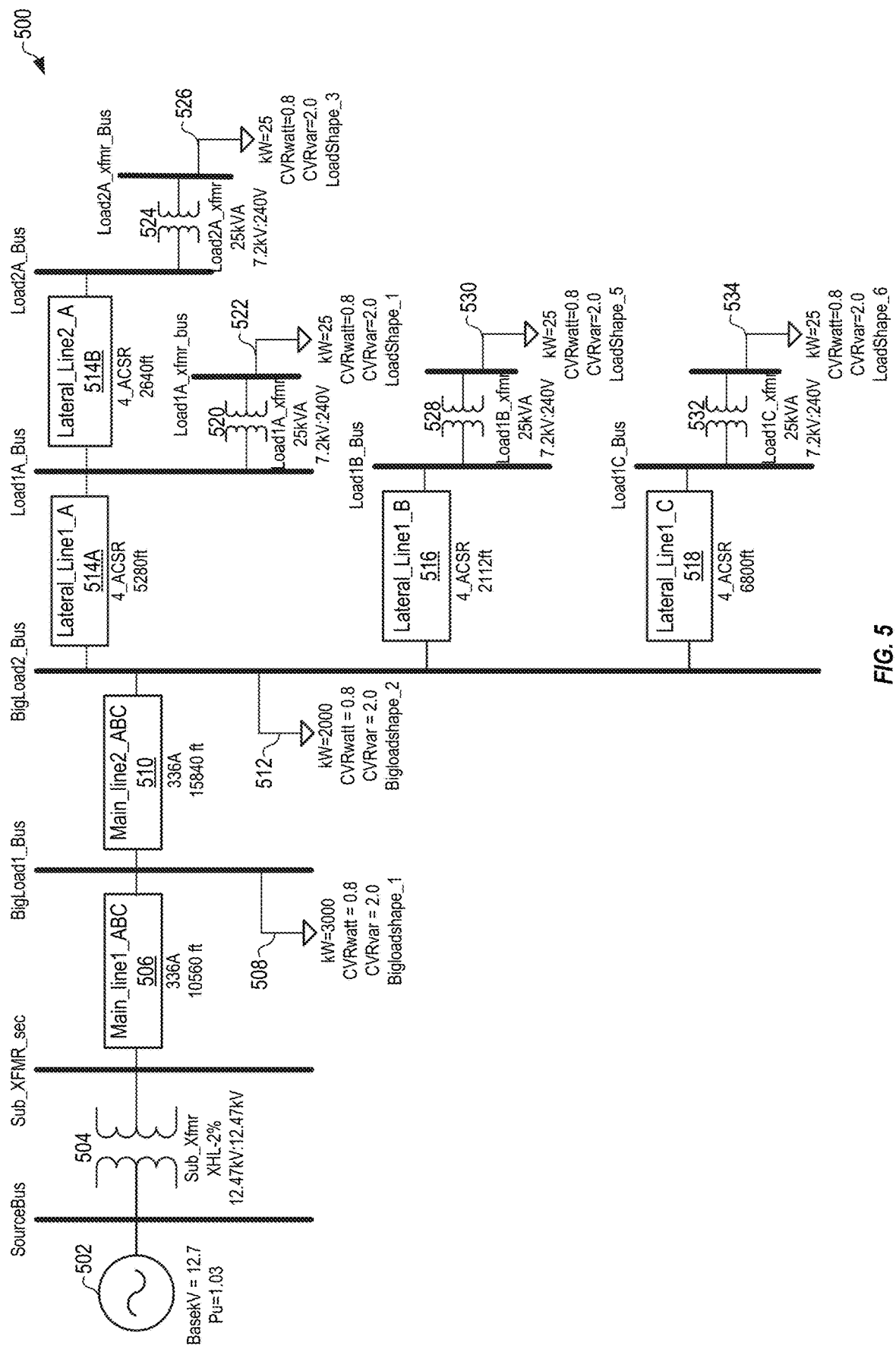
FIG. 5 illustrates an example network, in accordance with various embodiments of the present disclosure.

FIG. 5 illustrates an example network 500, in accordance with various embodiments of the present disclosure. Network 500 is an example of network 100. As illustrated there is a source 502 on the far left. The source 502 goes through a transformer 504 to a main line 506 (Main_line1_ABC) that powers a 3000 kW load 508 (Bigloadshape_1) and continues to another main line 510 (Main_line2_ABC) that powers a 2000 kW load 512 (Bigloadshape_2) that splits into three lateral lines 514, 516, 518 (Lateral_line1_A, Lateral_line1_B, Lateral_line1_C). First lateral line 514 includes two sub-lines: Lateral_line1_A 514A and Lateral_line2_A 514B. Lateral_line1_A 514A steps down via transformer 520 to power a 25 kW load 522. Lateral_line2_A 514B steps down via transformer 524 to power a different 25 kW load 526. Lateral_line1_B 516 steps down via transformer 528 to power a 25 kW load 530. Lateral_line1_C 518 steps down via transformer 532 to power a 25 kW load 534.

Figure 6:
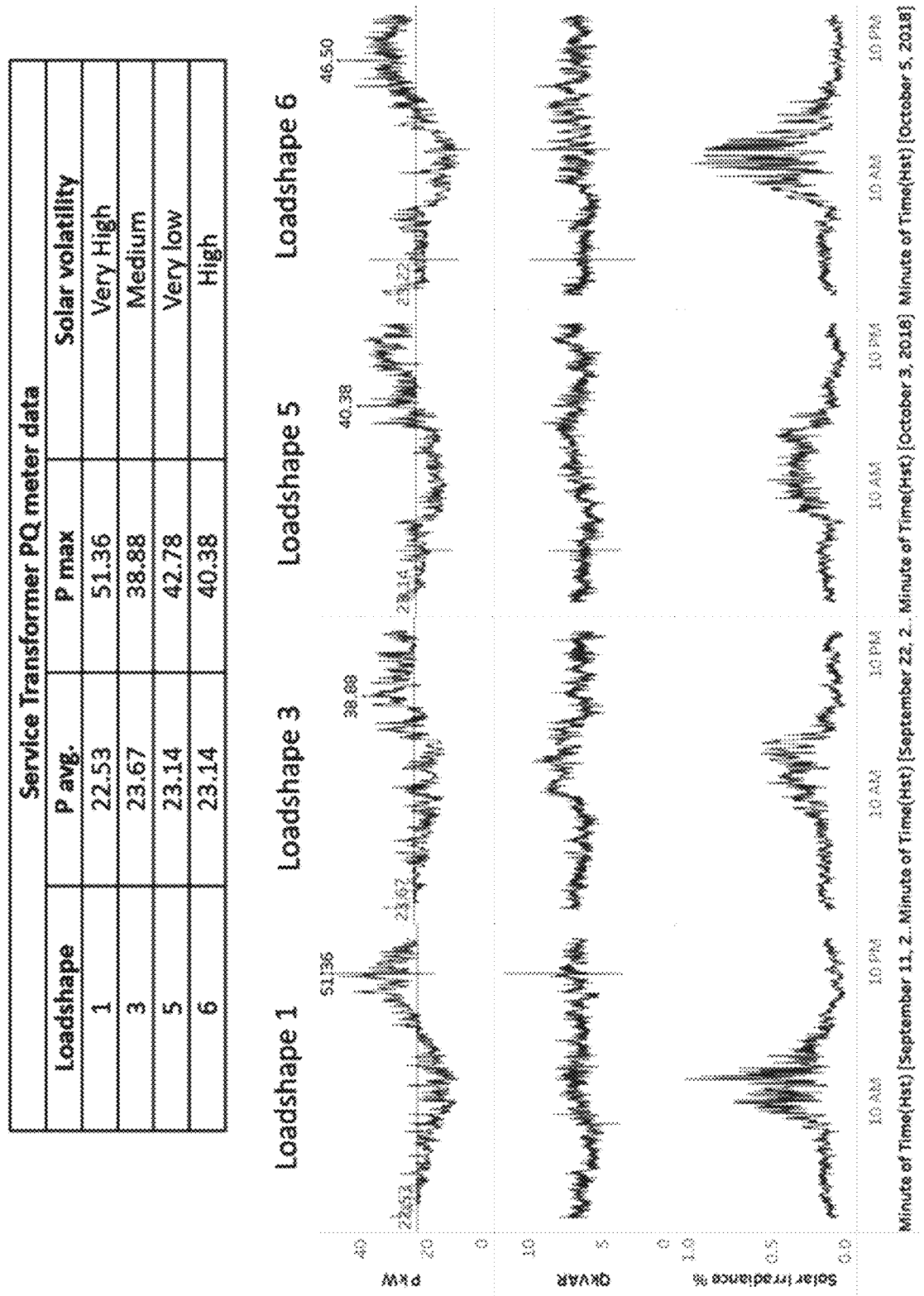
FIG. 6 illustrates example field data of real power, reactive power and solar irradiance percentage, in accordance with various embodiments of the present disclosure.

FIG. 6 illustrates example field data of real power, reactive power and solar Irradiance percentage, in accordance with various embodiments of the present disclosure. The field data illustrates patterns with natural dips and rises occurring throughout a day for real power, reactive power and solar Irradiance percentage. LoadShape 1, 3, 5, and 6 correspond to the load shapes of loads 522, 526, 530, and 534, respectively discussed in FIG. 5.

Figure 7:
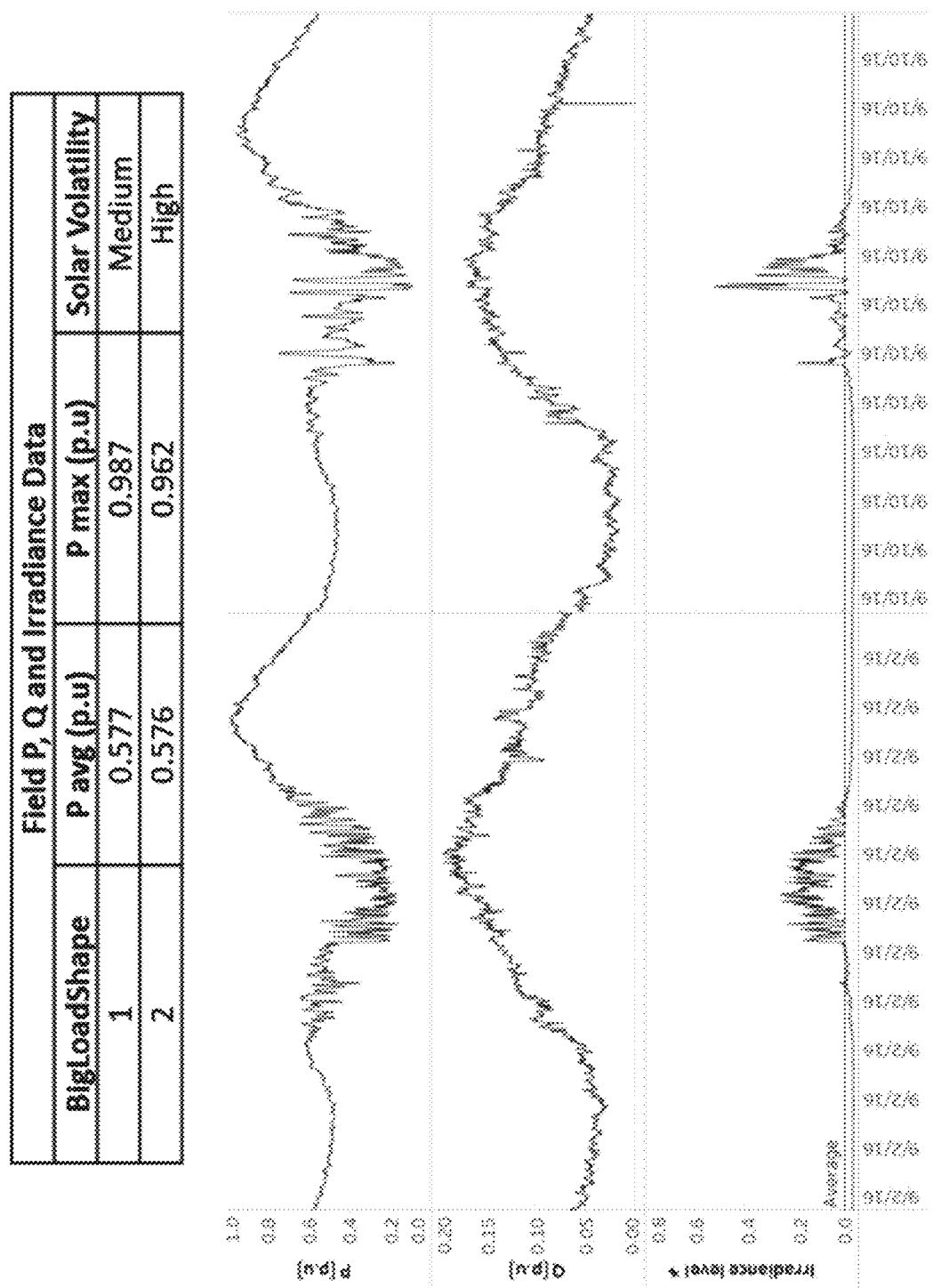
FIG. 7 illustrates example field data of real power, reactive power, and irradiance level, in accordance with various embodiments of the present disclosure.

FIG. 7 illustrates example field data of real power, reactive power, and irradiance level, in accordance with various embodiments of the present disclosure. The field data illustrates patterns with natural dips and rises occurring throughout a day for real power, reactive power, Irradiance level. Both BigLoadShape 1 and 2 correspond to the Big Load Shapes of loads 508 and 512, respectively discussed in FIG. 5.

Figure 8:
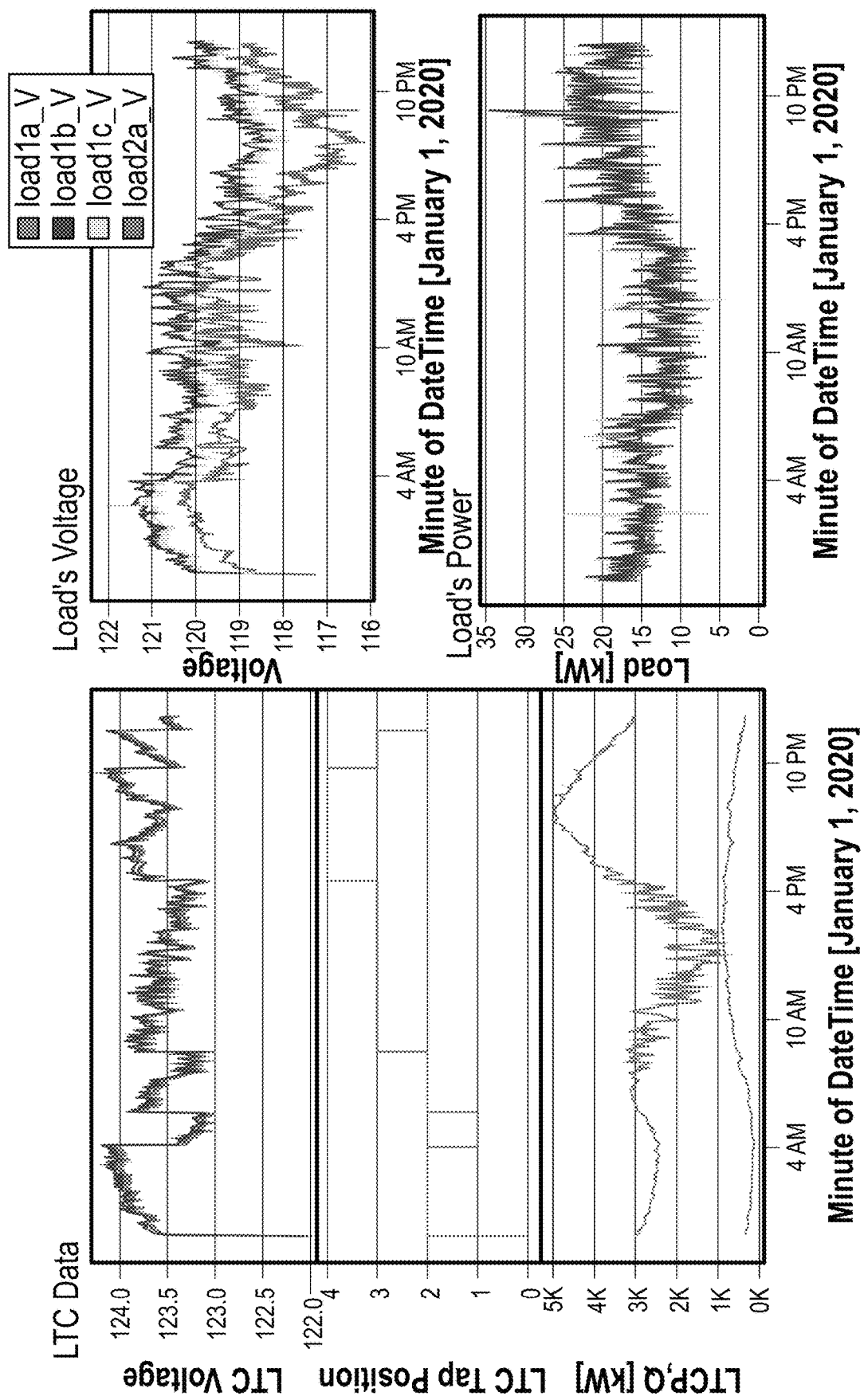
FIG. 8 illustrates example of simulated LTC data and corresponding changes in the load characteristics as a function of time, in accordance with various embodiments of the present disclosure.

FIG. 8 illustrates example LTC data and corresponding changes in the load characteristics as a function of time, in accordance with various embodiments of the present disclosure. The LTC data on the left illustrates the voltage and power (i.e., real and reactive) based on the LTC tap positions. In general, the LTC voltage has sharp changes in response to the LTC tap positions. On the right, the voltage over the same time frame are shown for four different loads. There is some correlation between the LTC tap positions and LTC voltage with the load voltage, though the differences are harder to identify due to all the natural variations and noise. Similarly, the load's power also generally follows the LTC real power curve, though the highs and lows are less clear. This simulation includes a LTC setpoint of 123.5V±1V with loads CVR factor of 0.8.

Figure 9:
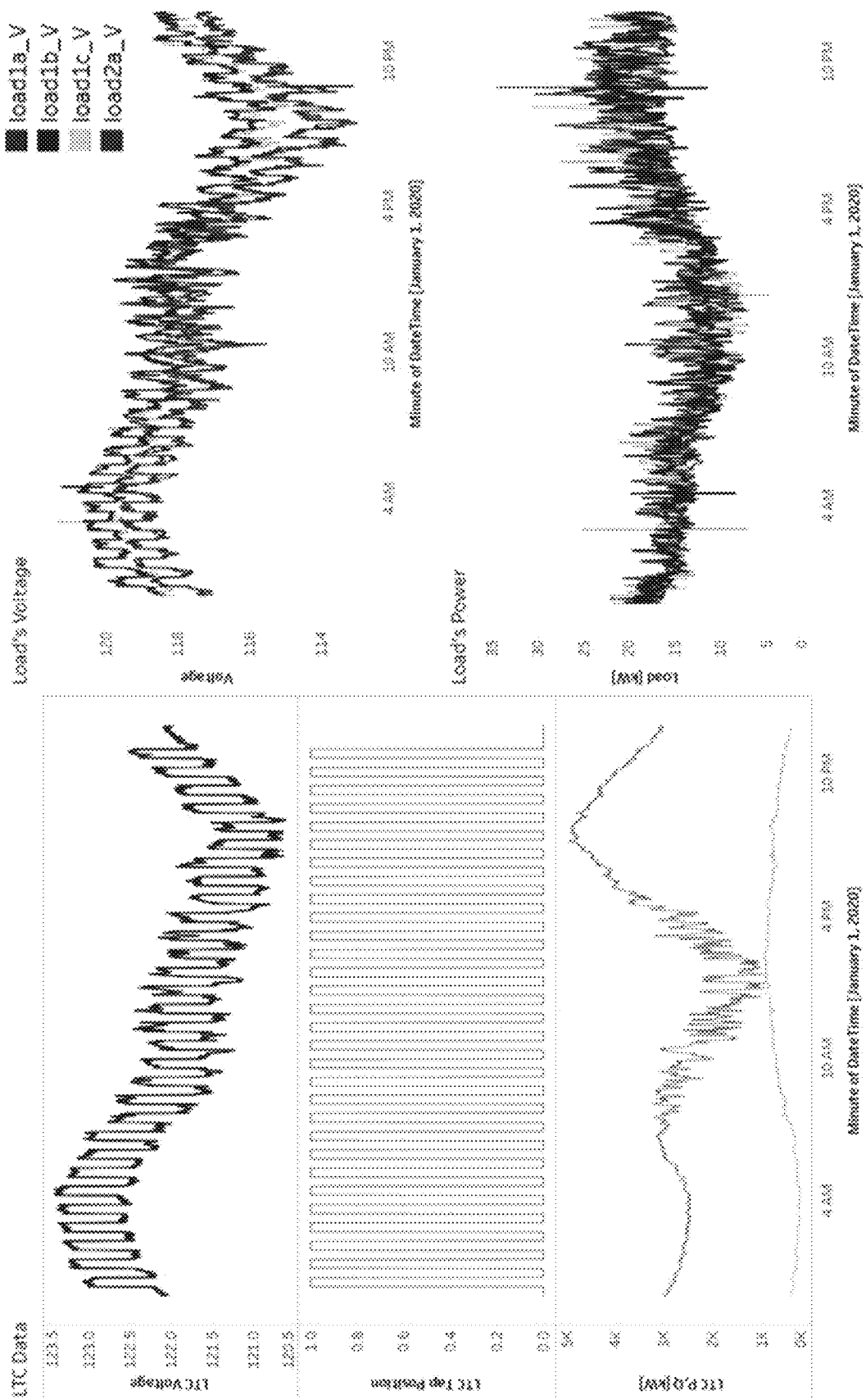
FIG. 9 illustrates simulation of 60 LTC operations and corresponding changes in the load characteristics as a function of time, in accordance with various embodiments of the present disclosure.

FIG. 9 illustrates 60 example LTC operations and corresponding changes in the load characteristics as a function of time, in accordance with various embodiments of the present disclosure. The LTC data on the left illustrates the voltage and power (i.e., real and reactive) based on 60 LTC operations. In general, the LTC voltage has sharp changes in response to the LTC operations. On the right, voltage over the same time frame are shown for four different loads. There is some correlation between the LTC tap positions and LTC voltage with the load voltage, though the differences are harder to identify due to all the natural variations and noise. Similarly, the load's power also generally follows the LTC real power curve, though the highs and lows are less clear. This simulation includes 60 LTC events with loads CVR factor of 0.8.

Figure 10:
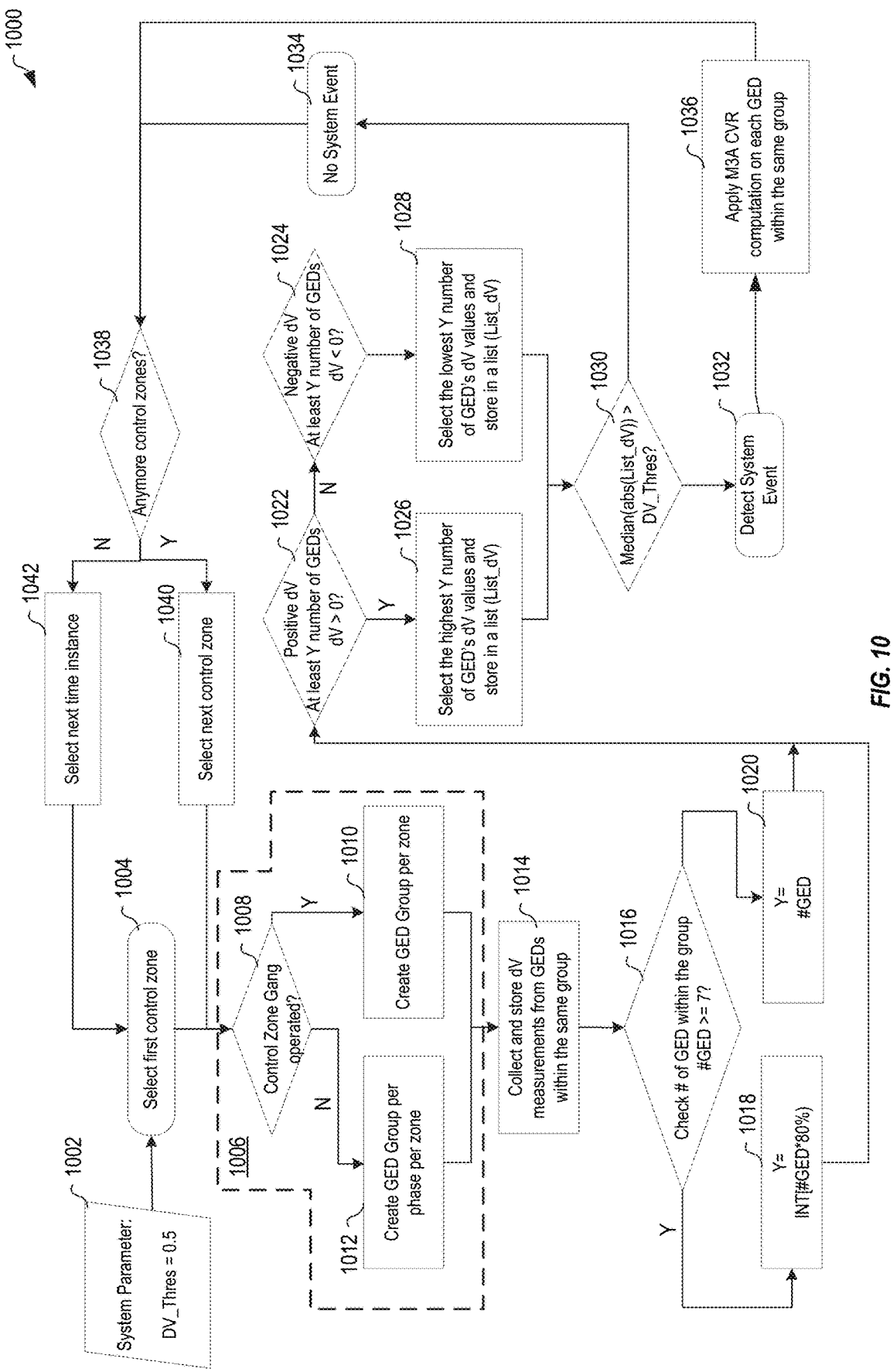
FIG. 10 is an operational flow diagram illustrating an example process for generating a local CVR factor, in accordance with various embodiments of the present disclosure.

FIG. 10 is an operational flow diagram illustrating an example process 1000 for generating a local CVR factor, in accordance with various embodiments of the present disclosure. Process 1000 may show additional blocks that are not specifically described with respect to process 200 but are understood to be components of process 200 even if not specifically stated. Thus, process 1000 is understood to be a more-detailed example of process 200, and thus the description thereof applies to process 200, and vice versa, unless otherwise stated or understood by those of ordinary skill in the art. In one embodiment, process 1000 is implemented at SCADA 150. Additionally or alternatively, one or more steps of process 1000 may be implemented throughout network 100, such as at one or more smart devices such as, but not limited to, edge of network grid optimization (ENGO) devices, Grid Edge Management System (GEMS) devices (such as those manufactured by Sentient Energy), smart inverters, smart meters (such as, but not limited to, the MM3™, UM3™, and/or ZM1™ Smart Meters sold by Sentient Energy), electric vehicle chargers, and other VAR sources. Examples of GEDs and/or VAR sources are described in U.S. patent application Ser. No. 14/659,418 entitled "Systems and Methods for Edge of Network Voltage Control of a Power Grid," which is incorporated herein by reference in its entirety.

In block 1002, a system parameter is obtained, or predefined. For example, a voltage threshold may be obtained. As illustrated, DV thresh, the voltage threshold, may be 0.5, though it should be appreciated that other values may be appropriate. For example, the voltage threshold may range from 0.3V to 2V.

In block 1004, a first control zone may be selected. Control zones may be organized by a control zone type, also referred to herein as a network parameter. One example of control zone type is whether the control zone is gang operated. Gang operated may refer to three phases being electrically or mechanically tied together so that the three phases tap up and down at the same time. Thus, those GEDs that are gang operated may define a network parameter used to arrange the GEDs into a group. It should be appreciated that these are merely examples of a variety of different network parameters used to group the GEDs, and other network parameters may be used to arrange the GEDs into groups.

Process 1000 also includes block 1006 in which devices (e.g., GEDs) are grouped together by network parameter into control zone(s). Block 1006 is an example of block 204. As discussed above, the example of process 1000 is shown for control zones based on gang operated devices, but other network parameters or more than one network parameter type may be used to define each control zone, without departing from the scope hereof. Block 1006 is shown with sub-blocks 1008, 1010, and 1012. In sub-block 1008, for each device being analyzed, it is determined if the device is gang operated. If so, then at block 1010, the analyzed device is either assigned to an already-created control zone, or a new control zone (group of GEDs) for that gang operated device is made. In one example, each control zone must have a threshold number of devices within it to create a group, such as three devices. If the analyzed device is not gang operated, then at block 1012, the analyzed device is either assigned to an already-created control zone, or a new control zone (group of GEDs) for the specific phase that the analyzed device is located on. In one example, each control zone must have a threshold number of devices within it to create a group, such as three devices. Based on the zone being gang operated (e.g. sub-block 1010), the power and voltage measurements for a zone, also referred to herein as a group, may be obtained or collected from the GEDs. Based on the control zone not being gang operated, power and voltage measurements for a group may be obtained from the GEDs from the same phase (e.g. sub-block 1012). The number of GEDs per zone may be greater than or equal to 3, as illustrated, though it should be appreciated that there may be cases where even two GEDs may suffice.

In block 1014, once the GEDs are arranged into different groups based on the control zone type, voltage change values, power change values, percentage voltage change values, and percentage power change values may be generated, obtained, and/or otherwise derived from measurements taken by the GEDs or other devices. Block 1014 is an example of block 202 of process 200.

Blocks 1016-1032 show an example of detecting or not detecting a system event based on the data collected by each GEDs, either within the GEDs themselves, or within each control zone (grouping of GEDs). Thus, blocks 1016-1032 collectively show an example of block 206.

The total number of GEDs in each group (or the overall network) may be determined in block 1016. These values may be used to determine whether a GED meets one or more event parameters. In control zones that have more than 6 GEDs, as shown by block 1018, it may be determined whether at least 80% of the GEDs each have a voltage change value of greater than or less than zero. In control zones that have less than 6 GEDs, as shown by block 1020, it may be determined whether all of the GEDs each have a voltage change value of greater than or less than zero.

In block 1022, the process 1000 analyzes whether the required number of GEDs in each control zone have a voltage change value (dV) (wherein, to account for differing locations of the GEDs with respect to the power grid, each voltage change value was recorded within a similar period based on the location of each GED) greater than 0 (e.g., either a threshold number (80% or another threshold) according to block 1018, or all the GEDs according to block 1020). Based on the required GEDs in the group having a voltage change value greater than zero, the voltage change values in the group may be used to determine a median of the absolute voltage change value that is compared to the voltage threshold in block 1030, which in this figure is 0.5V. In some embodiments, shown in block 1026, the 80% group may include the highest 80% (or some other amount) of voltage change values. In some embodiments, shown in block 1026, the voltage change values may be stored in a positive voltage change value list (List dV). The number of values stored in the positive value change list (List dV) may be less than or equal to the number of GEDs, and may be less than or equal to 80% of the number of GEDs in each control zone. Based on the median of the absolute voltage change value being greater than 0.5V, a system event may be detected in block 1032 and further analysis, as discussed herein may be applied to estimate the local CVR factor in block 1036. Block 1036 is an example of blocks 208 and 210 of process 200. Based on the median of the absolute voltage change value in this case being less than or equal to 0.5V, a system event may not be detected or identified in block 1034.

When the required number of GEDs (e.g., either a threshold number (80% or another threshold) according to block 1018, or all the GEDs according to block 1020) have a change in a voltage change value (dV) less than zero, the voltage change values in the required number of GEDs may be used to determine a median of the absolute voltage change value that is compared to the voltage threshold in block 1030. In some embodiments, the 80% group may include the lowest 80% (or some other amount) of voltage change values. In some embodiments, as shown in block 1028, the voltage change values may be stored in a negative voltage change value list (List dV). As shown in block 1030, based on the median of the absolute voltage change value being more than 0.5V, a system event may be detected in block 1032 and further analysis, as discussed herein, may be applied to estimate the local CVR factor in block 1036. Based on the median of the absolute voltage change value in this case being greater than or equal to 0.5V, a system event may not be detected or identified in block 1034.

After estimating the local CVR factor in block 1036, or determining there is no system event in block 1034, the same analysis may iterate according to blocks 1038-1042. If it is determined that there is another control zone to analyze in block 1038, the next control zone is selected in block 1040 and the process repeats at block 1006 (or 1014 if all control zones are already organized). If it is determined that there is not another control zone to analyze in block 1038, the next time instance is selected in block 1042 and the process repeats at block 1004 (or 1014 if all control zones are already organized). It should be appreciated that while example values are provided, such as 0.5V for the voltage threshold, 3 GEDs per group, the total number of GEDs being greater than or equal to 6, and 80% of the GEDs being used based on the total number of GEDs in a group being greater than 6, other values may be appropriate in different circumstances. For example, the voltage threshold may range from 0.3V-2V. The total number of GEDs may be 3, 5, 10, 25, etc. In embodiments, as the total number of GEDs in a group increases, less of the majority may be used than 80%, such as, for example, 70%, 60%, etc., though the increments may be by 1%, 0.1%, etc. In some embodiments, a greater percentage than 80% may be used, such as for example, 85%, 90%, 95%, etc. in various increments.

Figure 11:
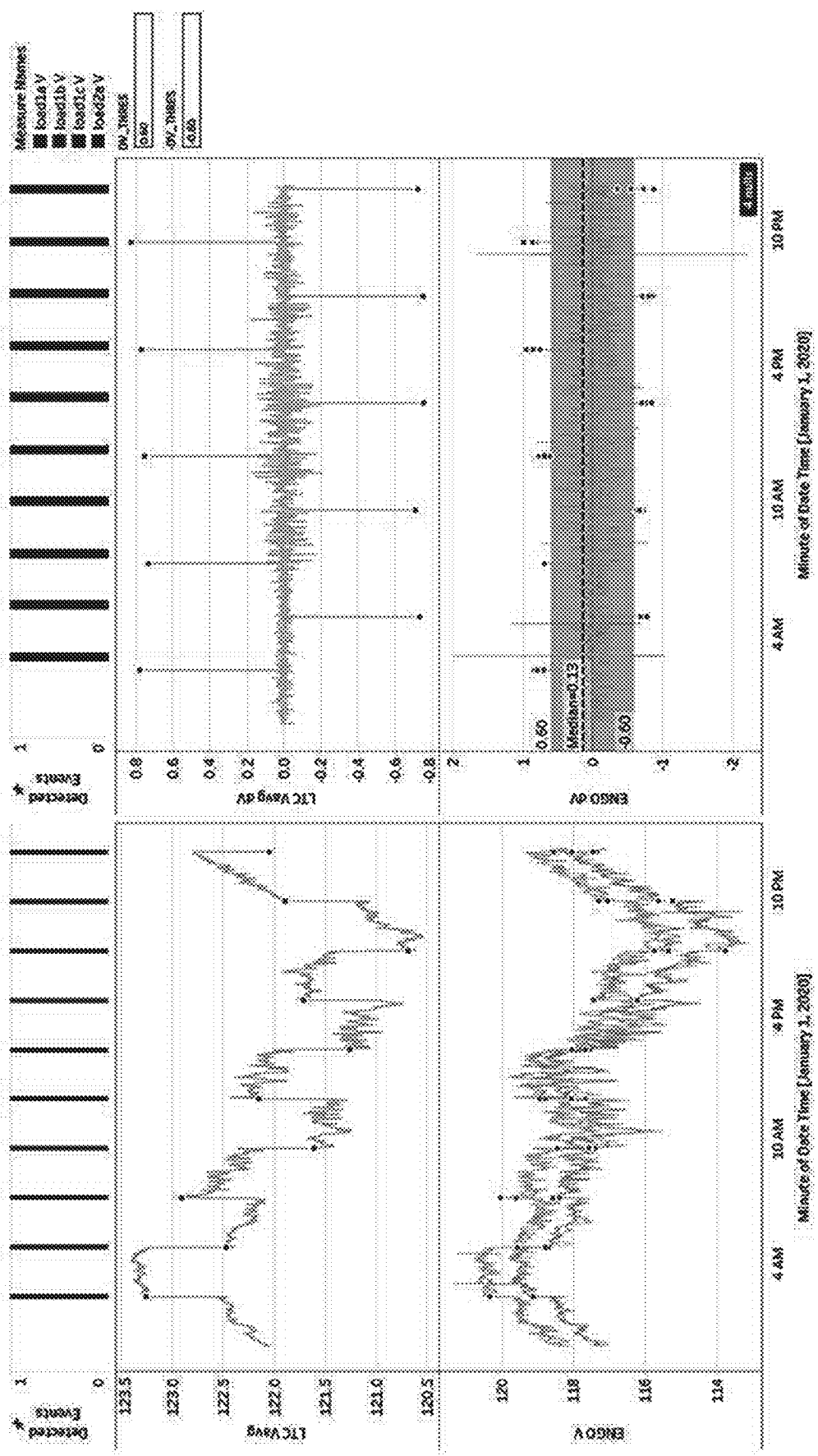
FIG. 11 illustrates example validation of the presently disclosed technology based on LTC events, in accordance with various embodiments of the present disclosure.

FIG. 11 illustrates example validation of the presently disclosed technology based on LTC events, such as those caused by LTC 140 implementing LTC control, in accordance with various embodiments of the present disclosure. The LTC voltage and LTC voltage change values are compared to GED voltages and GED voltage change values based on a voltage threshold of 0.6V. The presently disclosed technology is able to identify all 10 LTC operations. This simulation implemented process 1000 and includes 10 LTC events with a CVR factor of 0.8 and a voltage threshold of 0.6V.

Figure 12:
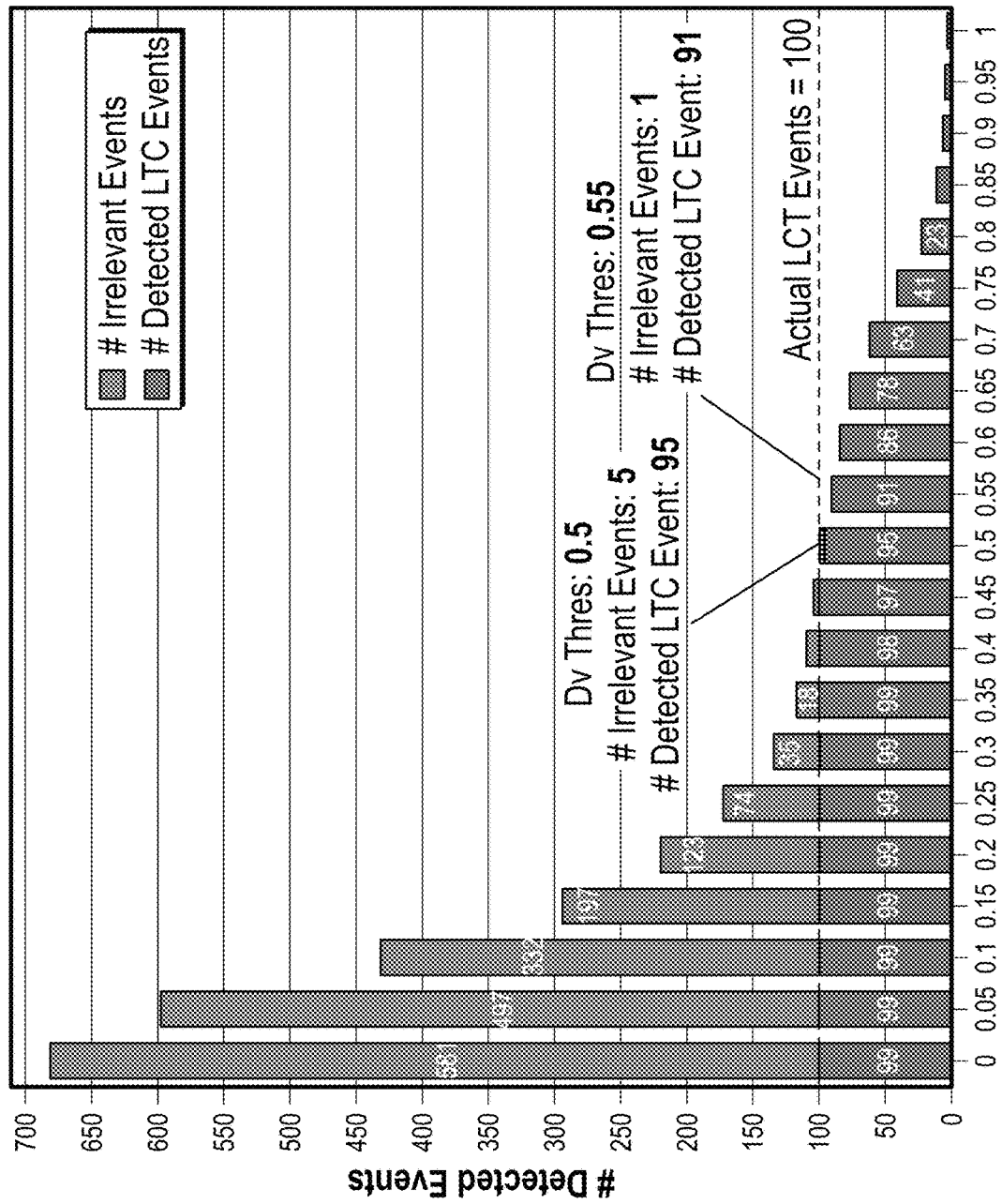
FIG. 12 is a graph illustrating the effect of changing a voltage threshold, in accordance with various embodiments of the present disclosure.

FIG. 12 is a graph illustrating the effect of changing a system parameter, such as the voltage threshold DV_Thres in block 1002, in accordance with various embodiments of the present disclosure. As the voltage threshold increases, the number of irrelevant events detected decreases with diminishing returns after 0.55V, while the number of detected LTC events, with 100 actual LTC events, does not change until 0.45V. Balancing these two parameters, in some embodiments, an effective voltage threshold range may be between about 0.5V to about 0.55V. This simulation includes 100 LTC events with a CVR factor of 0.8 and a voltage threshold between 0V to 1V.

Figure 13:
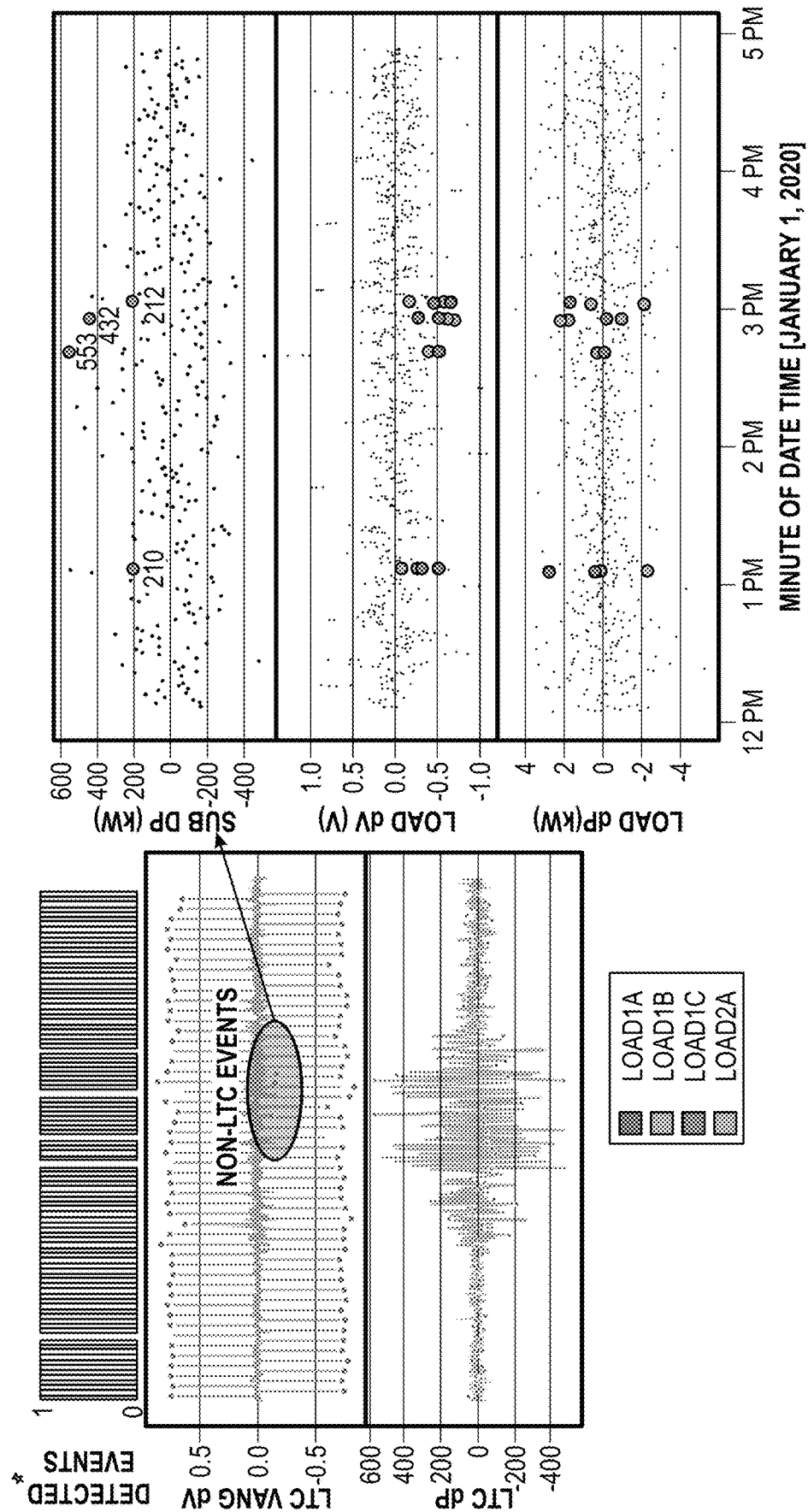
FIG. 13 illustrates capturing non-LTC events, in accordance with various embodiments of the present disclosure.

FIG. 13 illustrates non-LTC events, in accordance with various embodiments of the present disclosure. Non-LTC events are identified on the LTC Vavg dV graph. The sub dP graph identifies these Non-LTC events by the numbers 210, 553, 432, and 212. The non-LTC events occur based at least in part on the substation power change value being greater than 210 kW. In the Load dV graph, the four load voltages at this time are reduced together. The Load dP graph illustrates that the direction of power change is different for the four loads, which indicates that the voltage change values of the load are caused by the change of other loads. These graphs illustrate that a big load switching in or out can cause a voltage change on all other transformer locations. In zones where there are big loads, all detected voltage events may be valid. This simulation includes 100 LTC events with a CVR factor of 0.8 and a voltage threshold of 0.5.

Figure 14:
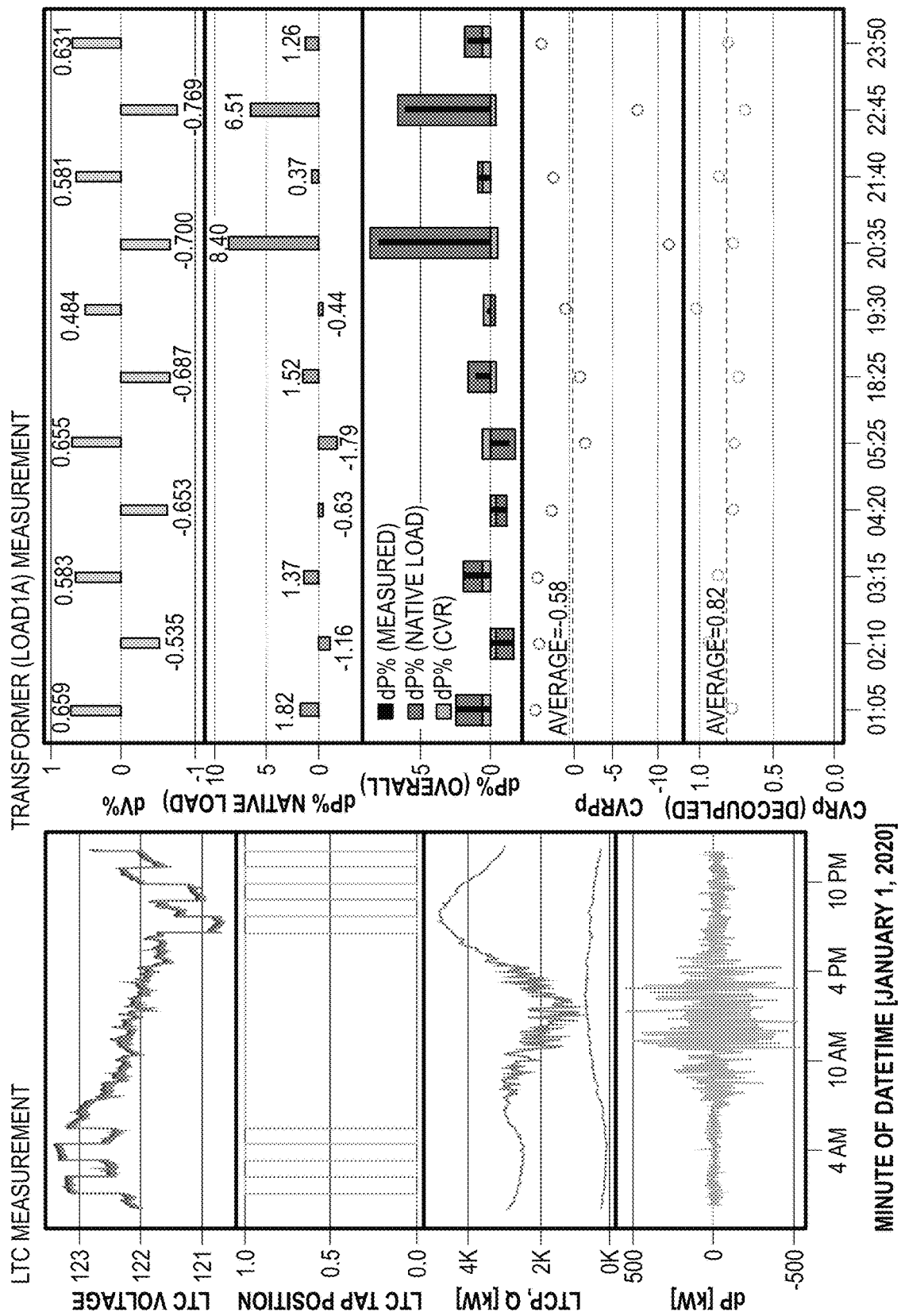
FIG. 14 illustrates voltage and power changes and CVR estimations at a transformer based on LTC events, in accordance with various embodiments of the present disclosure.

FIG. 14 illustrates voltage and power changes at a transformer based on LTC events, in accordance with various embodiments of the present disclosure. As illustrated, the graphs on the left side are LTC measurements of voltage, tap position, power, and change in power. The LTC voltage graph shows voltage changes based on the LTC positions, the LTC power, and the change in power graph shows the most change near the center of the graph, corresponding with the changes in the LTC power graph. The graphs on the right illustrate transformer measurements of percentage voltage change, percentage power change of the native load, overall percentage power change, the CVR factor based on overall percentage power change, and the CVR factor decoupled from the native load. As illustrated in the percentage voltage change graph, the percentage voltage change of the transformer does not equal the 0.625% difference corresponding to a one tap change. Instead, the percentage voltage change ranges from about 0.48% to about 0.77%. The graph illustrating percentage power change of the native load shows big swings at 8.40 and 6.51 which largely impact the overall percentage power change value, as illustrated more clearly in the overall percentage power change graph. The CVR factor based on overall percentage power change graph does not provide an accurate CVR factor at specific times or as an average, which helps illustrate the utility and novelty of the presently disclosed technology. The CVR factor decoupled from the native load graph is more accurate at specific times and as an average at estimating the CVR factor. This simulation includes 11 LTC events with a single tap change with a CVR factor of 0.8.

Figure 15:
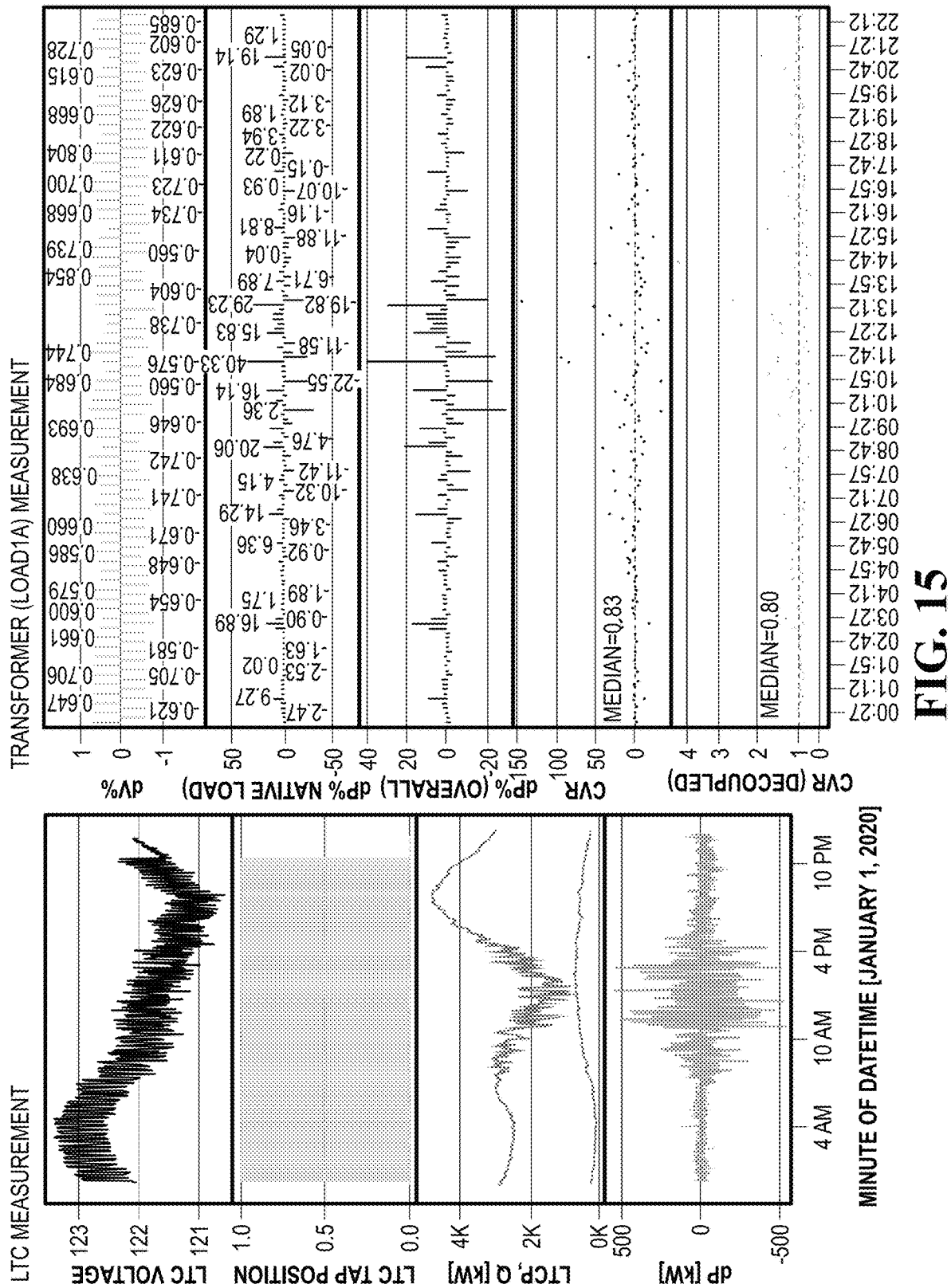
FIG. 15 illustrates voltage and power changes and CVR estimations at a transformer based on LTC events, in accordance with various embodiments of the present disclosure.

FIG. 15 illustrates voltage and power changes at a transformer based on LTC events, in accordance with various embodiments of the present disclosure. As illustrated, the graphs on the left side are LTC measurements of voltage, tap position, power, and change in power. The LTC voltage shows voltage changes based on the LTC positions, the LTC power graph illustrates a sinusoidal curve and the change in power shows the most change near the center of the graph, corresponding with the changes in the LTC power graph. The graphs on the right illustrate transformer measurements of percentage voltage change, percentage power change of the native load, overall percentage power change, the CVR factor based on overall percentage power change, and the CVR factor decoupled from the native load. The graph illustrating percentage power change of the native load shows big swings throughout this time frame, going up to 40.33 and going as low as −22.55, which is also reflected in the overall percentage power change graph. The CVR factor based on overall percentage power change graph becomes more accurate with more events used to calculate the CVR factor, showing a median CVR factor at 0.83, while the CVR factor decoupled from the native load graph is exactly the same as the true CVR factor, further validating the presently disclosed technology. This simulation includes 150 LTC events with a single tap change with a CVR factor of 0.8.

Figure 16:
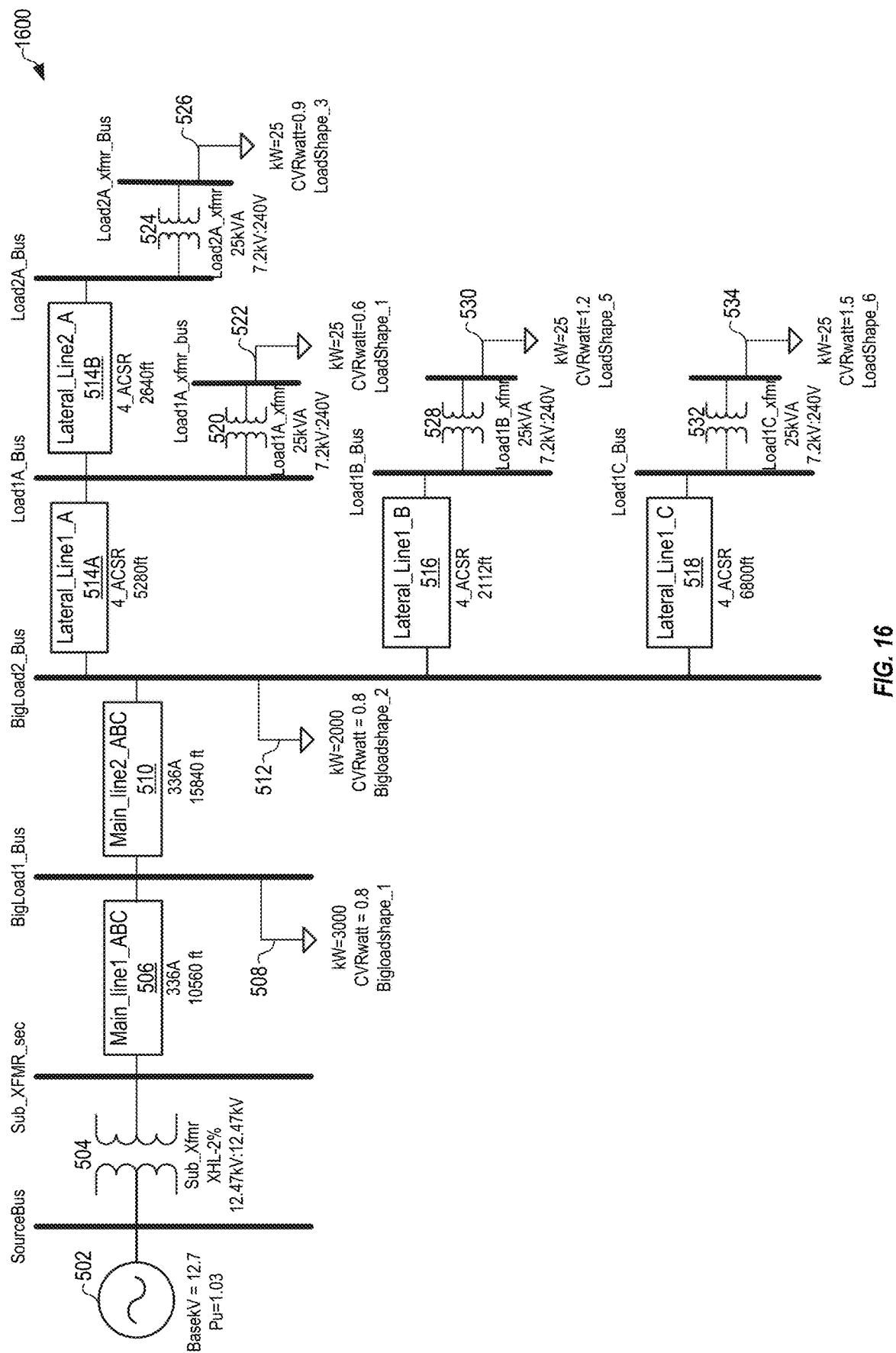
FIG. 16 illustrates an example network, in accordance with various embodiments of the present disclosure.

FIG. 16 illustrates an example network, in accordance with various embodiments of the present disclosure. This network is substantially similar to the network illustrated in FIG. 5 and thus each element is numbered the same. The differences from FIG. 5 may include the loads on the right, LoadShape_1, LoadShape_3, LoadShape_5, and LoadShape_6, that have varying CVR factors instead of being constant at 0.8 as in FIG. 5. The CVR factors for the respective loads are 0.6, 0.9, 1.2, and 1.5 respectively.

Figure 17:
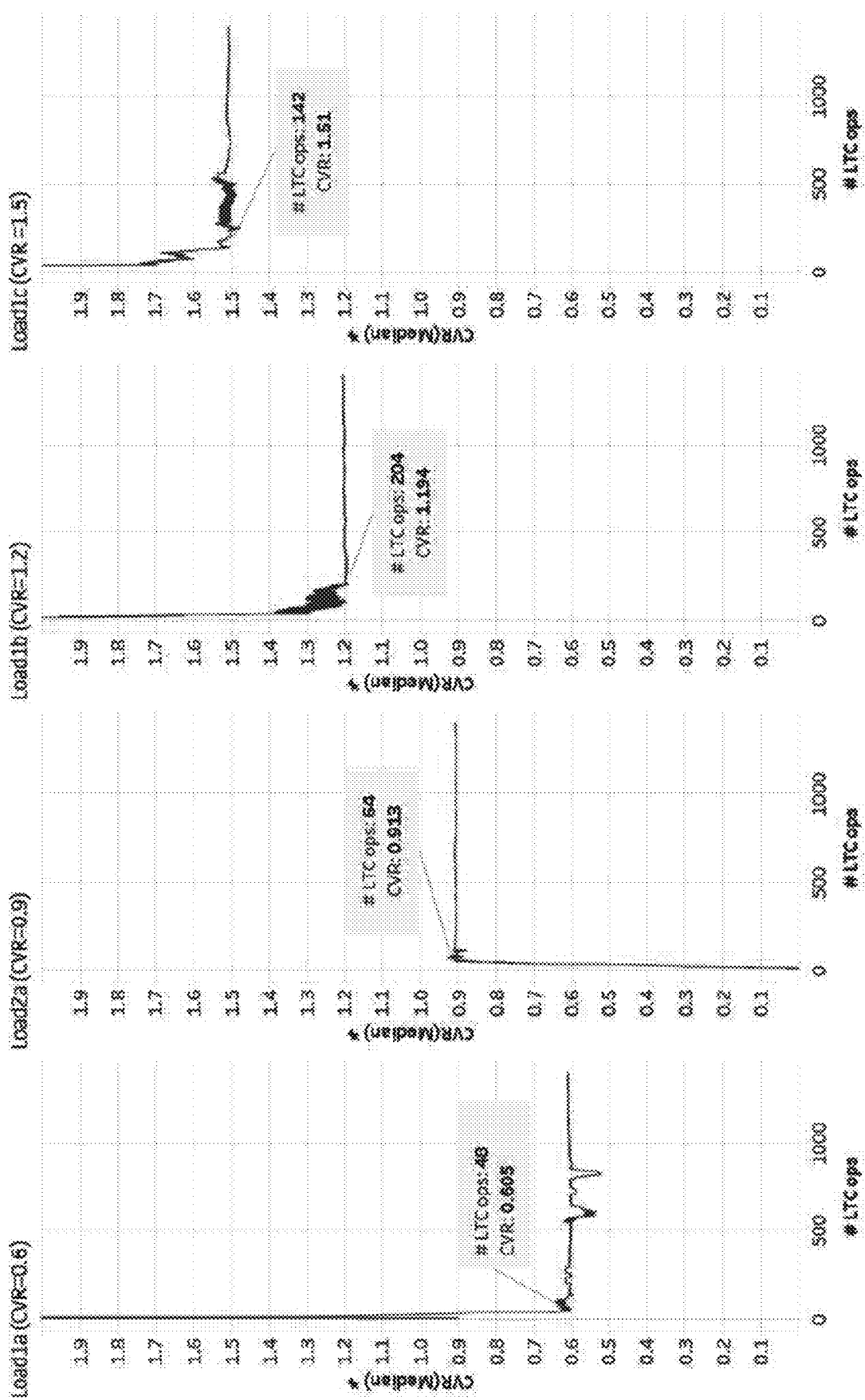
FIG. 17 illustrates detecting different CVR factors for the loads in FIG. 16, in accordance with various embodiments of the present disclosure.

FIG. 17 illustrates detecting different CVR factors for the loads in FIG. 16, in accordance with various embodiments of the present disclosure. The graphs illustrate the median CVR factor as the number of LTC operations increases. In all the graphs, the CVR factor reaches and converges toward the true CVR factor, which is fixed for all loads throughout the day. This simulation includes 1400 LTC events with a voltage threshold of 0.5, and different CVR factors for each load: 0.6, 0.9, 1.2, and 1.5.

Figure 18:
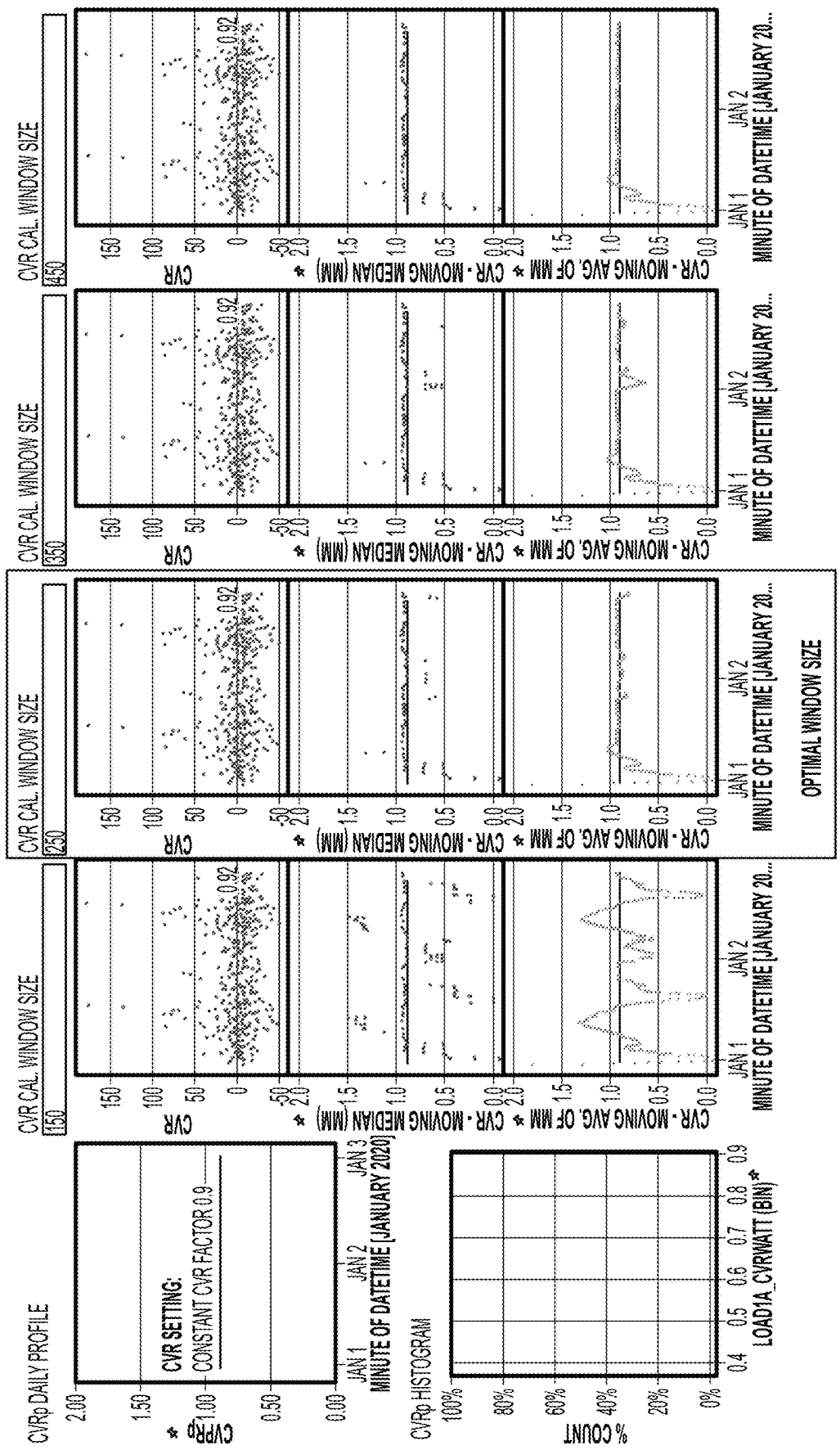
FIG. 18 illustrates an actual constant CVR factor compared to a calculated CVR factor using different window sizes, in accordance with various embodiments of the present disclosure.

FIG. 18 illustrates an actual constant CVR factor compared to a calculated CVR factor using different window sizes, in accordance with various embodiments of the present disclosure. As illustrated, the true CVR factor is constant at 0.9 throughout the time frame. The CVR factor, the moving median of the CVR factor, and the moving average of the moving median of the CVR factor are graphed at different window sizes to capture a different number of voltage events. The window size of 250 (i.e., sample of voltage events) balances computing resources with a median CVR factor that is close to the true CVR factor. This simulation includes 900 LTC events over a two day period with a CVR factor of 0.9.

Figure 19:
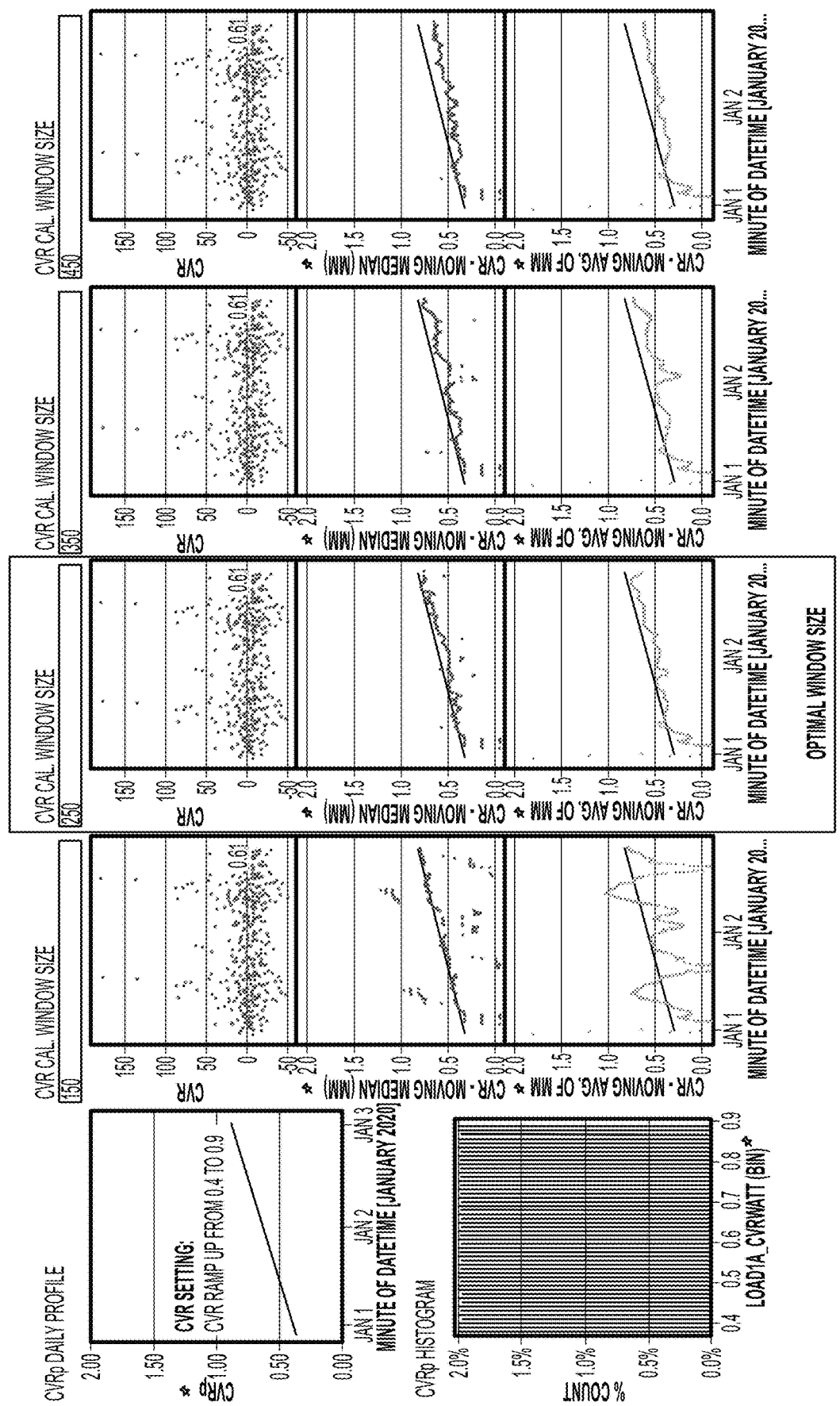
FIG. 19 illustrates an actual CVR factor that changes as a function of time compared to a calculated CVR factor using different window sizes, in accordance with various embodiments of the present disclosure.

FIG. 19 illustrates an actual CVR factor that changes as a function of time compared to a calculated CVR factor using different window sizes, in accordance with various embodiments of the present disclosure. As illustrated, the true CVR factor starts at 0.4 and linearly increases to 0.9 during the time frame. The CVR factor, the moving median of the CVR factor, and the moving average of the moving median of the CVR factor are graphed at different window sizes to capture a different number of voltage events. The window size of 250 (i.e., sample of voltage events) balances computing resources with a median CVR factor that is close to the true CVR factor as it dynamically changes. This simulation includes 900 LTC events over a two day period with a CVR factor starting at 0.4 and linearly increasing to 0.9. It should be appreciated that the number of voltage events to estimate the local CVR factor can vary with the load. In embodiments, individual GEDs can determine the appropriate window size for the moving median calculation. In some embodiments, the number of events may be determined based on a sufficient number of samples (e.g., ranging from 5-15) around "zero median" for natural load variation so that adding one more sample would not cause the median to jump to a much different value.

Figure 20:
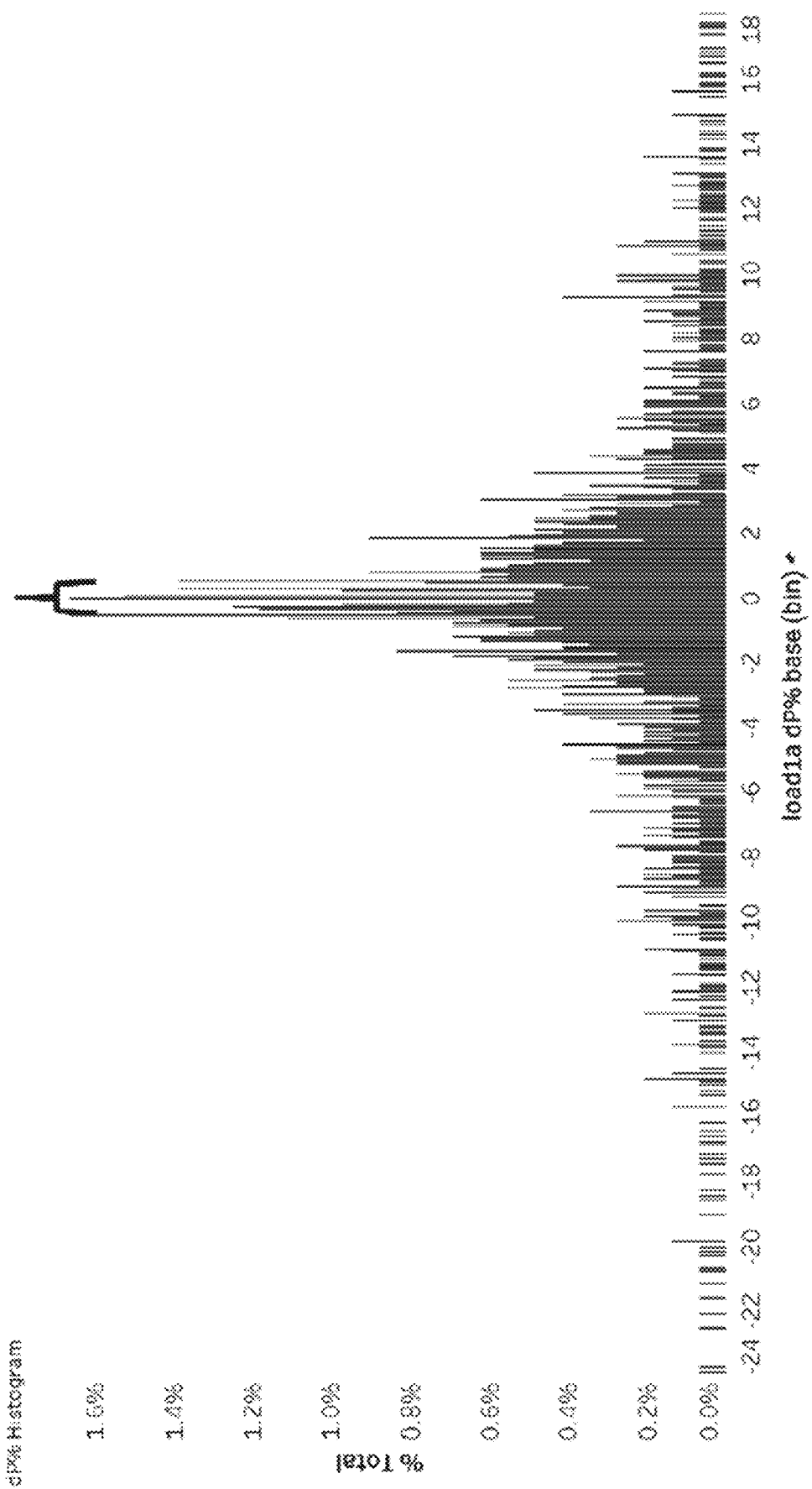
FIG. 20 is a histogram of percentage power change, in accordance with various embodiments of the present disclosure.

FIG. 20 is a histogram of percentage power change measured at the transformer, in accordance with various embodiments of the present disclosure. As illustrated by the bracket at the top, about 3.2% of voltage events are within ±0.625%. The CVR estimation error may be determined based on $$CVR\ error = \frac{\text{Native load } dP\ \%}{DV\ \%(\text{voltage event})}$$

Single LTC tap operation events may result in dV %=0.625% (0.75V). This value ensures the single median measurement of CVR event error is within +/−1V error. While 0.625% is used, it should be appreciated that any value between 0.5%-0.8% may be used.

Figure 21:
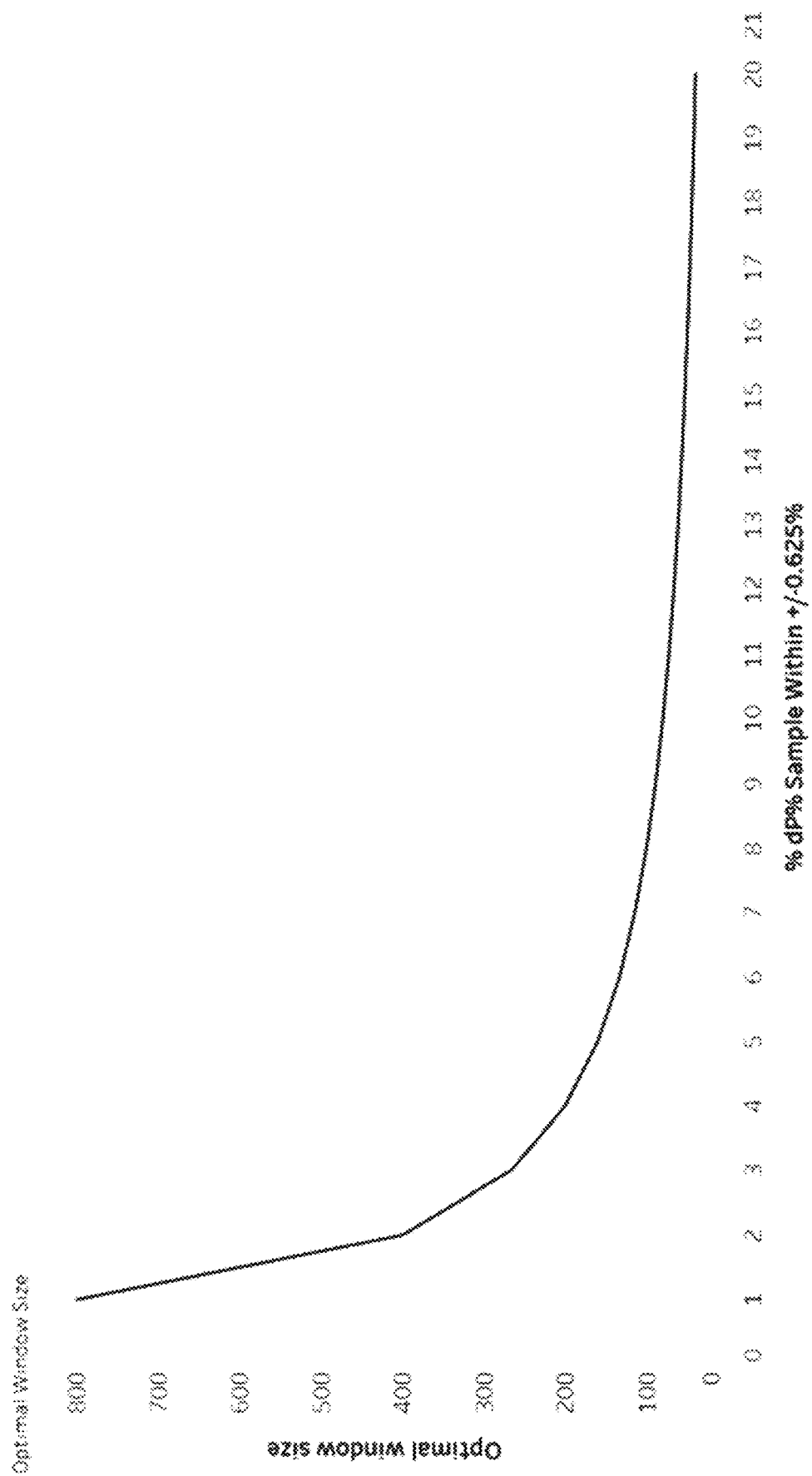
FIG. 21 is a graph illustrating a window size based on a percentage power change sample within a percentage power threshold, in accordance with various embodiments of the present disclosure.

FIG. 21 is a graph illustrating a window size based on a percentage power change sample within a percentage power threshold, in accordance with various embodiments of the present disclosure. As illustrated the optimal, or appropriate, window size, indicating the total number of voltage events to use, decreases as the percent of power change that are within ±0.625% increase. In some embodiments, a window size may be generated by measuring and obtaining percentage power change values for about seven days, though it should be appreciated that a smaller or larger time frame may be appropriate (e.g., three days, fourteen days, one month, etc.). The window size may be generated based on $$\text{window size} = \frac{8}{\% \, \Delta PSample_{within \pm 0.625\%}}$$

where $\% \, \Delta PSample_{within \pm 0.625\%}$ may refer to the percent of power change that are within ±0.625%. This window size may be based on generating a sufficient number of median CVR values for a given load to be used to estimate a local CVR factor.

Figure 22:
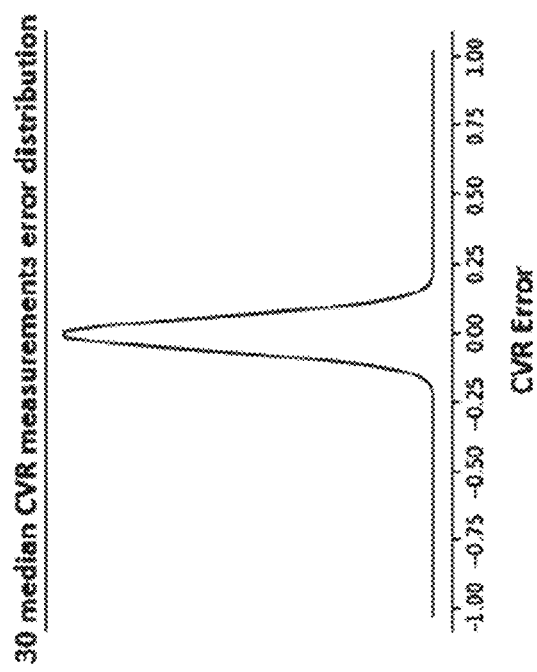
FIG. 22 are graphs illustrating the change to CVR error based on aggregating median CVR measurements, in accordance with various embodiments of the present disclosure.
Figure 22:
Figure 22:
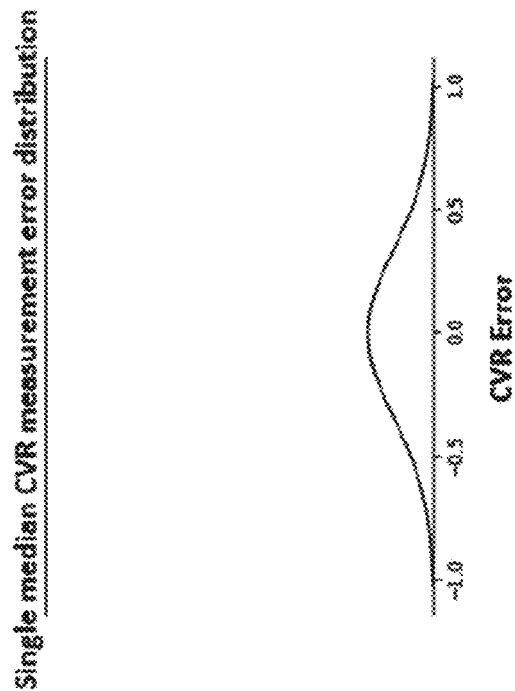

FIG. 22 are graphs illustrating the change to CVR error based on aggregating median CVR factor measurements, in accordance with various embodiments of the present disclosure. Based on the 3.2% of natural change of power samples being within the ±0.625% range and a percentage voltage change of about 0.625% as well, the median GED CVR factor measurements would have an error distribution as illustrated. The mean may be 0, the standard deviation $\sigma e$ may be 0.34, and $$CVR_{\pm error(95\% \, confidence)} = 1.96\sigma_e = 0.7$$

However, by aggregating around 30 median GED CVR factor measurements, the error distribution dramatically decreases, as illustrated on the right. The mean may still be 0, and the standard deviation may be determined based on the below:

$$\sigma_{\hat{e}} = \frac{\sigma_e}{\sqrt{N}} = \frac{0.34}{\sqrt{30}} = 0.062$$

and $$CVR_{\pm error(95\% \, confidence)} = 1.96\sigma_{\hat{e}} = 0.12$$

which is a much smaller error than the 0.7 using single median GED CVR measurements.

Figure 23:
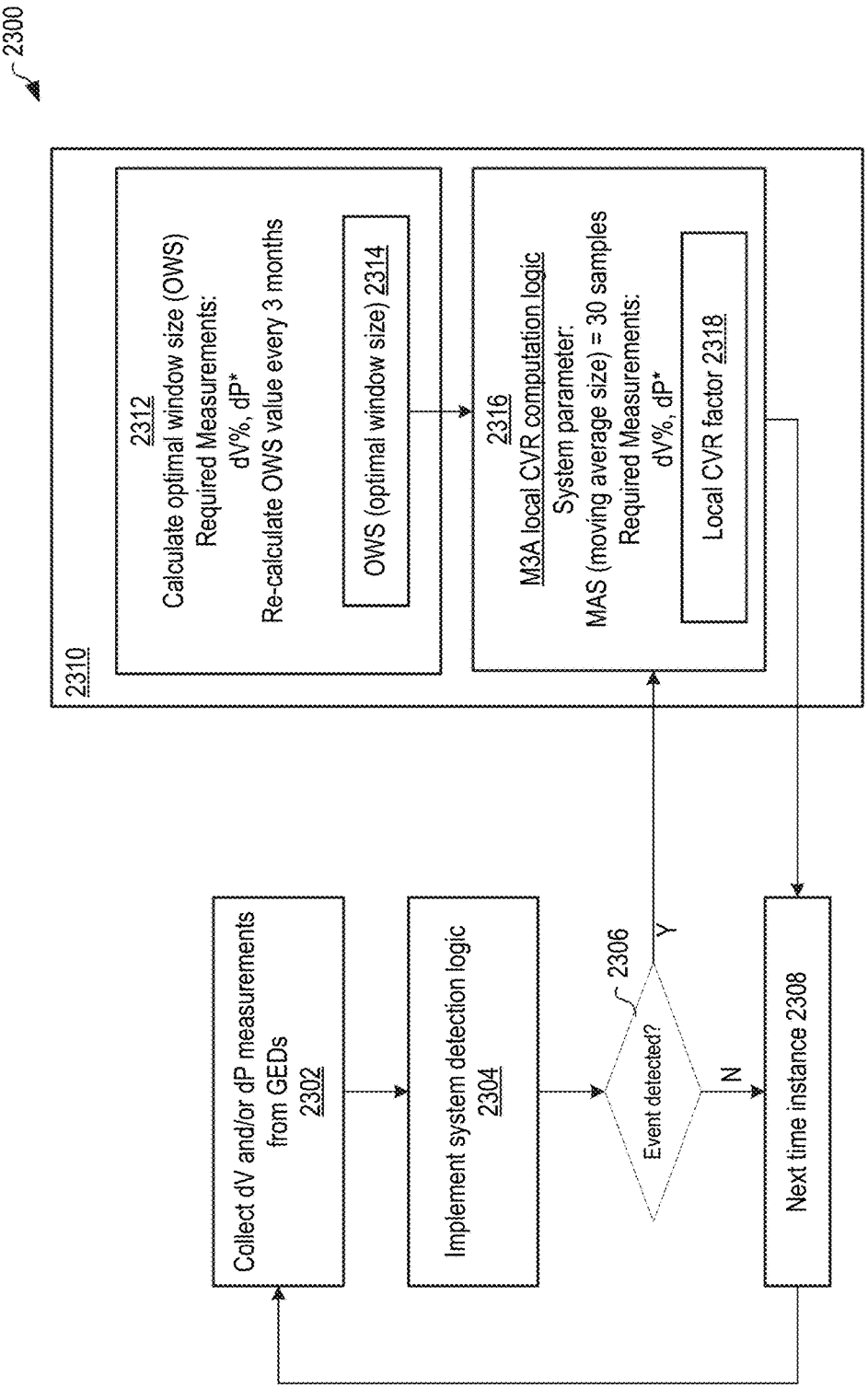
FIG. 23 is an operational flow diagram illustrating an example process for generating a local CVR factor, in accordance with various embodiments of the present disclosure.

FIG. 23 is an operational flow diagram illustrating an example process 2300 for generating a local CVR factor, in accordance with various embodiments of the present disclosure. Process 2300 is an example of blocks 208 and 210 of process 200, and block 1036 of process 1000. In one embodiment, process 2300 is implemented at SCADA 150. Additionally or alternatively, one or more steps of process 2300 may be implemented throughout network 100, such as at one or more smart devices such as, but not limited to, edge of network grid optimization (ENGO) devices, Grid Edge Management System (GEMS) devices (such as those manufactured by Sentient Energy), smart inverters, smart meters (such as, but not limited to, the MM3™. UM3™, and/or ZM1™ Smart Meters sold by Sentient Energy), electric vehicle chargers, and other VAR sources. Examples of GEDs and/or VAR sources are described in U.S. patent application Ser. No. 14/659,418 entitled "Systems and Methods for Edge of Network Voltage Control of a Power Grid," which is incorporated herein by reference in its entirety.

In block 2302, all voltage change values taken from GEDs are obtained and input into the system event detection logic. Block 2302 is an example of block 202 of process 200, and block 1014 of process 1000. The system event detection logic may use a voltage threshold of 0.5V such as defined in block 1002. In block 2304, the process 2300 implements system event detection logic. To implement block 2304, the system event detection logic may detect a system event based on one or more event parameters such as described with respects to blocks 1016-1034 of process 1000. In block 2308, in the case where it does not detect a system event, the same process is repeated at the next time instance such as described with respect to block 1042 of process 1000.

Based on a system event being detected in block 2306, an independent process 2310 may occur for each GED. Block 2310 is an example of block 1036 of process 1000. In sub-blocks 2312 of block 2310, a window size 2314 may be generated based on at least part of a generated percentage voltage change and generated percentage power change. In embodiments, the window size 2314 may be re-determined every 3 months, though it should be appreciated that this may occur more often or less often (e.g., every month, every 6 months, every year, etc.). Using the window size 2314, in block 2316 the local CVR factor 2318 may be generated, or estimated, with a moving average size of about 30 samples, though it should be appreciated that the number of samples may be more or less (e.g., 10, 15, 20, 25, 35, 40, 45, 50, etc.).

Figure 24:
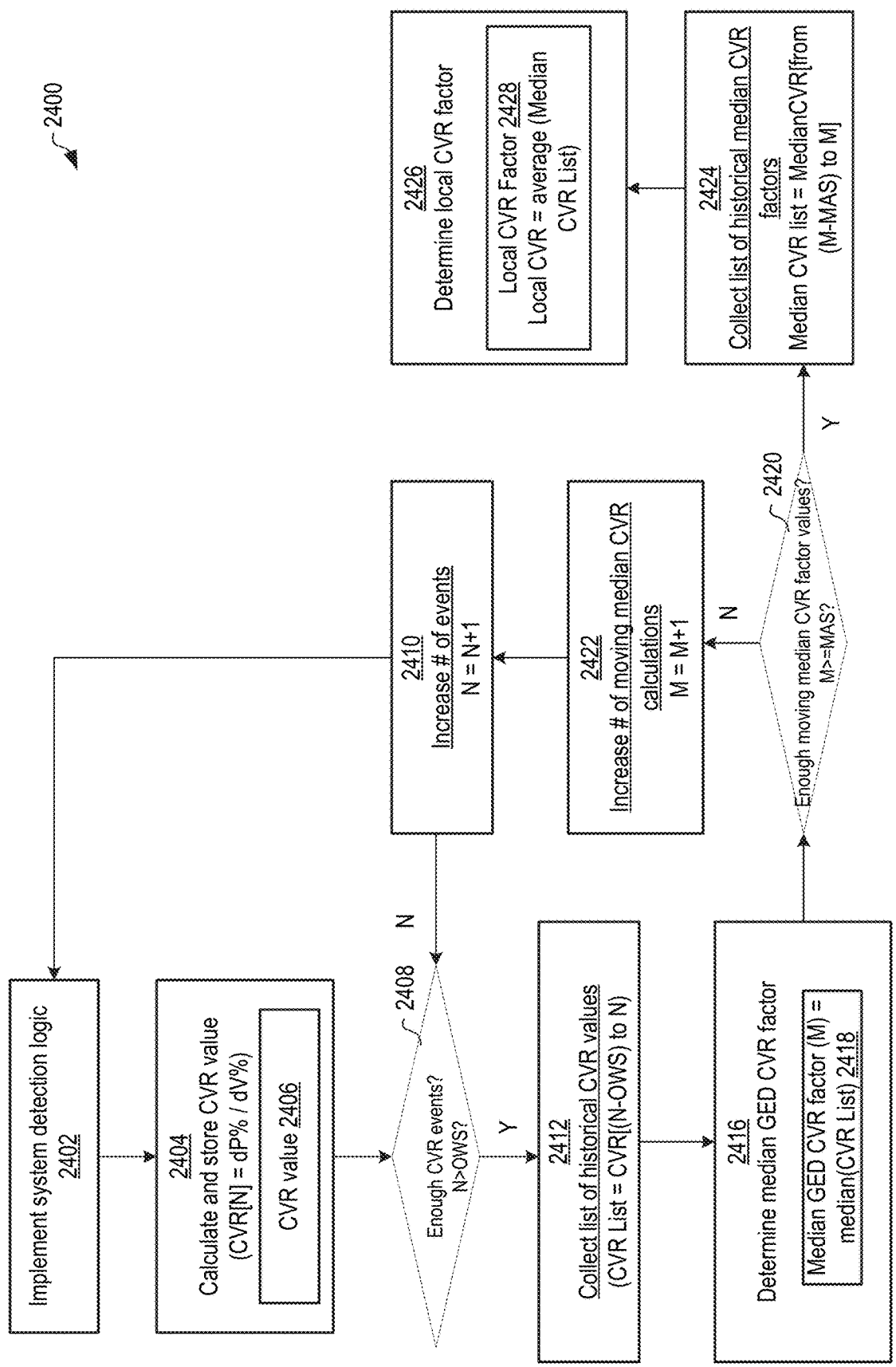
FIG. 24 is an operational flow diagram illustrating an example process for using GED CVR factors to generate a local CVR factor, in accordance with various embodiments of the present disclosure.

FIG. 24 is an operational flow diagram illustrating an example process 2400 for using GED CVR factors to generate a local CVR factor, in accordance with various embodiments of the present disclosure. Process 2400 is an example of block 1036 of process 100, and block 2316 of process 2300, in embodiments. In one embodiment, process 2400 is implemented at SCADA 150. Additionally or alternatively, one or more steps of process 2400 may be implemented throughout network 100, such as at one or more smart devices such as, but not limited to, edge of network grid optimization (ENGO) devices, Grid Edge Management System (GEMS) devices (such as those manufactured by Sentient Energy), smart inverters, smart meters (such as, but not limited to, the MM3™, UM3™, and/or ZM1™ Smart Meters sold by Sentient Energy), electric vehicle chargers, and other VAR sources. Examples of GEDs and/or VAR sources are described in U.S. patent application Ser. No. 14/659,418 entitled "Systems and Methods for Edge of Network Voltage Control of a Power Grid," which is incorporated herein by reference in its entirety.

Process 2400 may use GED parameters to generate the local CVR factor. These GED parameters may include a moving average size of about 30 samples, a window size as discussed herein, a number of CVR events, and a number of median GED CVR factor. It should be appreciated that another number of samples for the moving average size may be appropriate in different use cases. In addition, while the window size is illustrated as being updated every 3 months, other time periods may be appropriate as well for different use cases.

In block 2402, process 2400 detects a system event. Block 2402 is an example of block 2304. In an embodiment, to implement block 2402, the system event detection logic may detect a system event based on one or more event parameters such as described with respects to blocks 1016-1034 of process 1000.

Based on detecting a system event in block 2402, in block 2404, a CVR value 2406 for the detected event may be generated and stored based on the percentage power change value and the percentage voltage change value for each event. In block 2408, the number of events may be compared to the window size. The window size may be generated based on block 2312 of process 2300, discussed above, and/or based on process 2500 discussed below. Where the number of detected events (N) is less than the window size (e.g., OWS 2314), the count may be increased in block 2410 and the method repeats at block 2402 to identify more events.

Where the number of events (N) is equal to or greater than the window size (e.g., OWS 2314), in block 2412, the list of GED CVR events within the window defined by the OWS is collected. In some embodiments of block 2412, to generate the CVR list, process 2400 may identify each the GED CVR value 2406 from each of the total number of CVR events (N) minus the window size OWS to the total number of CVR events (N). In block 2416, process 2400 may then calculate a moving median GED CVR factor 2418 based on these identified GED CVR events. Any other statistic may be used in block 2416, such as average, median, and mode or other statistical calculation(s). Thus, the moving median GED CVR factor 2418 is defined by a statistical calculation (such as mean, median, and/or mode or other statistic) based on each recorded CVR value within the OWS.

In block 2420, the number of moving median GED CVR factors (M) 2418 calculated may be compared to a moving average size as defined in the GED parameters. If the number of median GED CVR factors (M) is less than the moving average size, then process 2400 increases, at block 2422, the number of moving median CVR calculated values stored in memory, and proceeds with blocks 2410.

If, in block 2420, if the number of moving median GED CVR factors (M) 2418 is greater than or equal to the moving average size, then process 2400, proceeds with block 2424 and obtains the list of historical stored median CVR factors 2418 from the memory. In embodiments, block 2420 includes identifying the most-recently stored median GED CVR factor (M) 2418 from the total number of median GED CVR factors minus the moving average size to the total number of median GED CVR factor.

In block 2426, based on the moving median GED CVR factors (M) 2418 over the moving average size, the process 2400 determines a local CVR factor 2428. In one embodiment, to calculate the local CVR factor 2428, an average may be taken of the moving median GED CVR factors (M) 2418 over the moving average size. Local CVR factor 2428 is an example of local CVR factor 2318. Thus, the resulting local CVR factor 2428 is specific to each GED, and based on the historical data collected by that GED. This local CVR factor 2428 may then be used to control the operating parameters of the GED to achieve improved performance.

Figure 25:
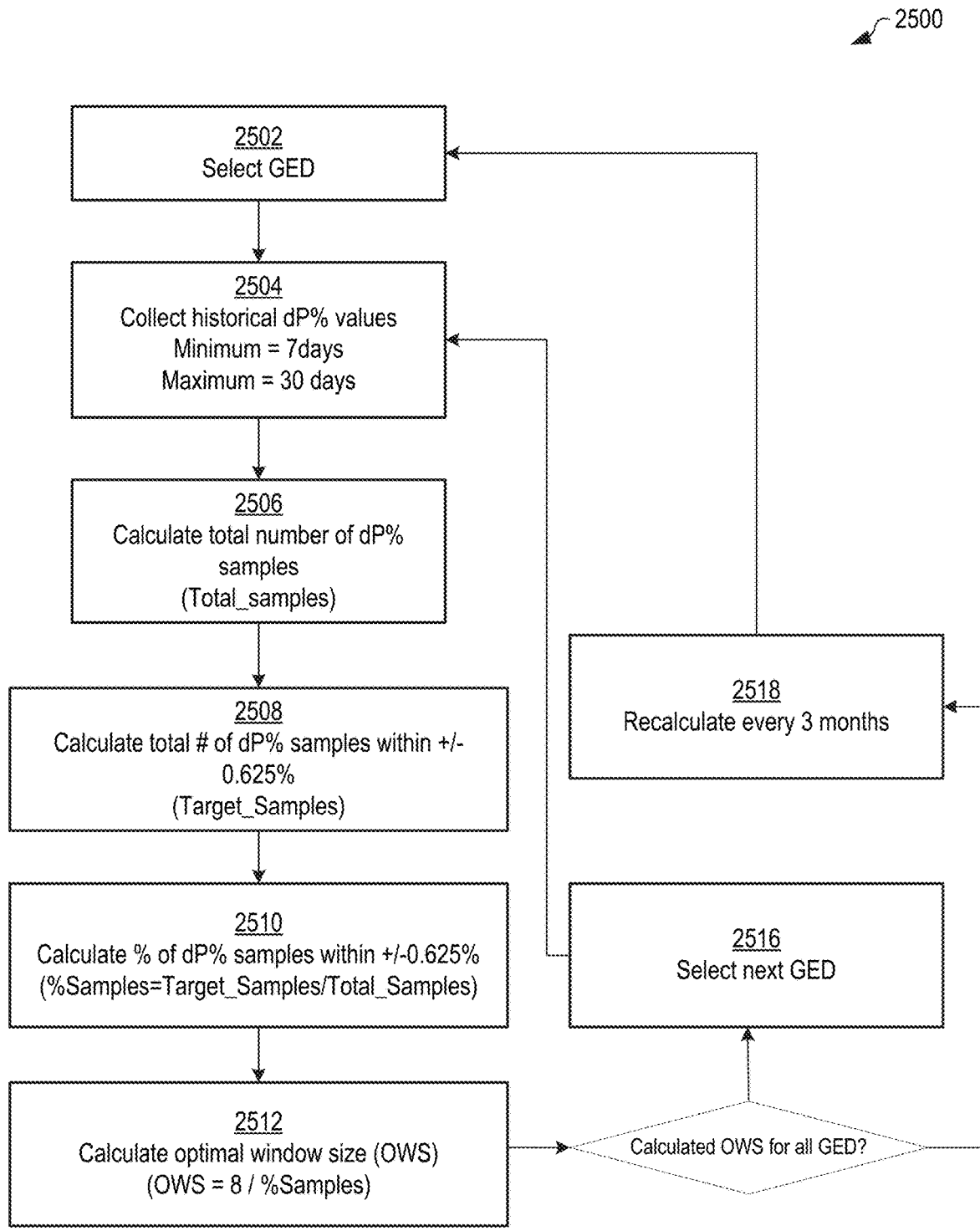
FIG. 25 is an operational flow diagram illustrating an example process for determining a window size, in accordance with various embodiments of the present disclosure.

FIG. 25 is an operational flow diagram illustrating an example process 2500 for determining a window size, in accordance with various embodiments of the present disclosure. In embodiments, process 2500 is an example of block 2312 and generates optimal window size 2314. In one embodiment, process 2500 is implemented at SCADA 150. Additionally or alternatively, one or more steps of process 2500 may be implemented throughout network 100, such as at one or more smart devices such as, but not limited to, edge of network grid optimization (ENGO) devices, Grid Edge Management System (GEMS) devices (such as those manufactured by Sentient Energy), smart inverters, smart meters (such as, but not limited to, the MM3™, UM3™, and/or ZM1™ Smart Meters sold by Sentient Energy), electric vehicle chargers, and other VAR sources. Examples of GEDs and/or VAR sources are described in U.S. patent application Ser. No. 14/659,418 entitled "Systems and Methods for Edge of Network Voltage Control of a Power Grid," which is incorporated herein by reference in its entirety.

In block 2502, process 2500 selecting a first GED. In block 2504, for the selected GED, process 2500 collects historical percentage power change values that are stored in memory (e.g., and collected in block 202, 1014, and/or 2304). In embodiments, this may include percentage power change values going back three days, five days, seven days, fourteen days, thirty days, sixty days, etc. in various increments. In block 2506, process 2500 identifies a total number of percentage power change samples (Total_Samples). In block 2508, process 2500 may identify a number of target samples (Target_Samples) of the total number of samples (Total_Samples) having a value within ±0.625% from 0. In block 2510, process 2500 may identify the percentage of Target_samples to Total_Samples, by taking the number of percentage power change samples having a value within ±0.625% from 0 (Target_Samples) and dividing it by the total number of percentage power change samples (Total-_Samples). The sample percentage may be used to generate a window size (OWS).

In embodiments, the window size OWS may be a number events occurring around the zero median, divided by the percentage of samples calculated in step 2510. The number of events around the zero median impacts the CVR estimation. The higher number of events around the zero median, the more stable. However, this requires more CVR events to determine an appropriate estimation. Conversely, the lower the number of events around the zero median, the less stable the CVR estimation is. Thus, the selected number of events balances the stability of the CVR estimation to the necessary number of CVR events to achieve an appropriate estimation. In one example, the optimal window size is eight divided by the sample percentage (% Samples). Any other value other than 8 may be selected without departing from the scope hereof, such as between 5-15 events around the zero median such as discussed above with respect to FIG. 19.

In blocks 2514 and 2516, process 2500 determines if a respective OWS has been calculated for each GED. If not, then process 2500 selects the next GED and repeats at block 2504 until all GEDs have an OWS calculated therefore. Furthermore, in block 2518, process 2500 implements a refresh timer in which, in embodiments, the window size OWS may be re-determined after expiration of an OWS refresh period (such as every 3 months, though this may be a shorter or longer time frame in different use cases).

Figure 26:
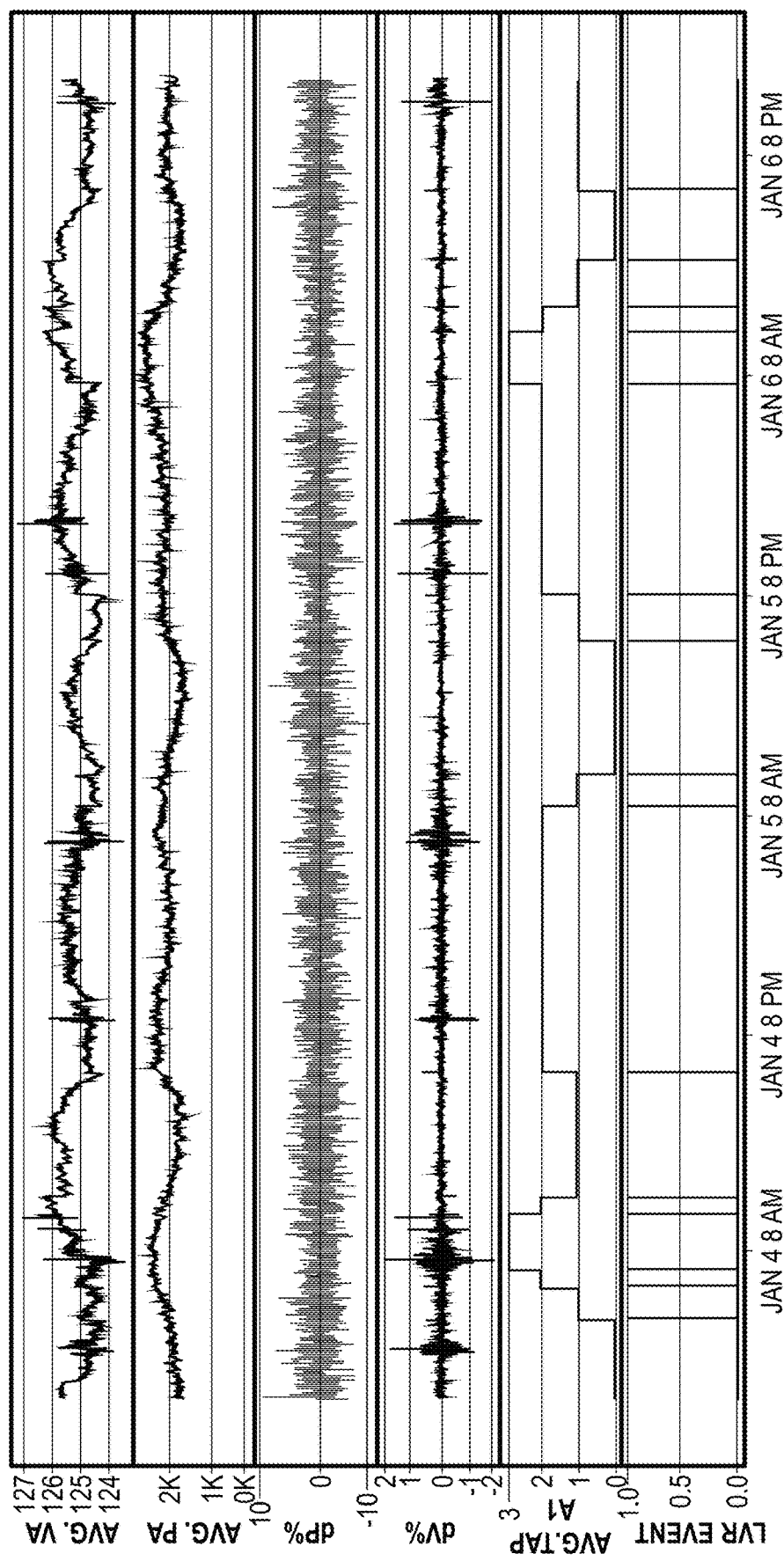
FIG. 26 illustrates example field data, in accordance with various embodiments of the present disclosure.

FIG. 26 illustrates example field substation voltage regulator data, in accordance with various embodiments of the present disclosure. Average voltage, average power, percentage power change, percentage voltage change, tap position data, and voltage events are illustrated over a two day period.

Figure 27:
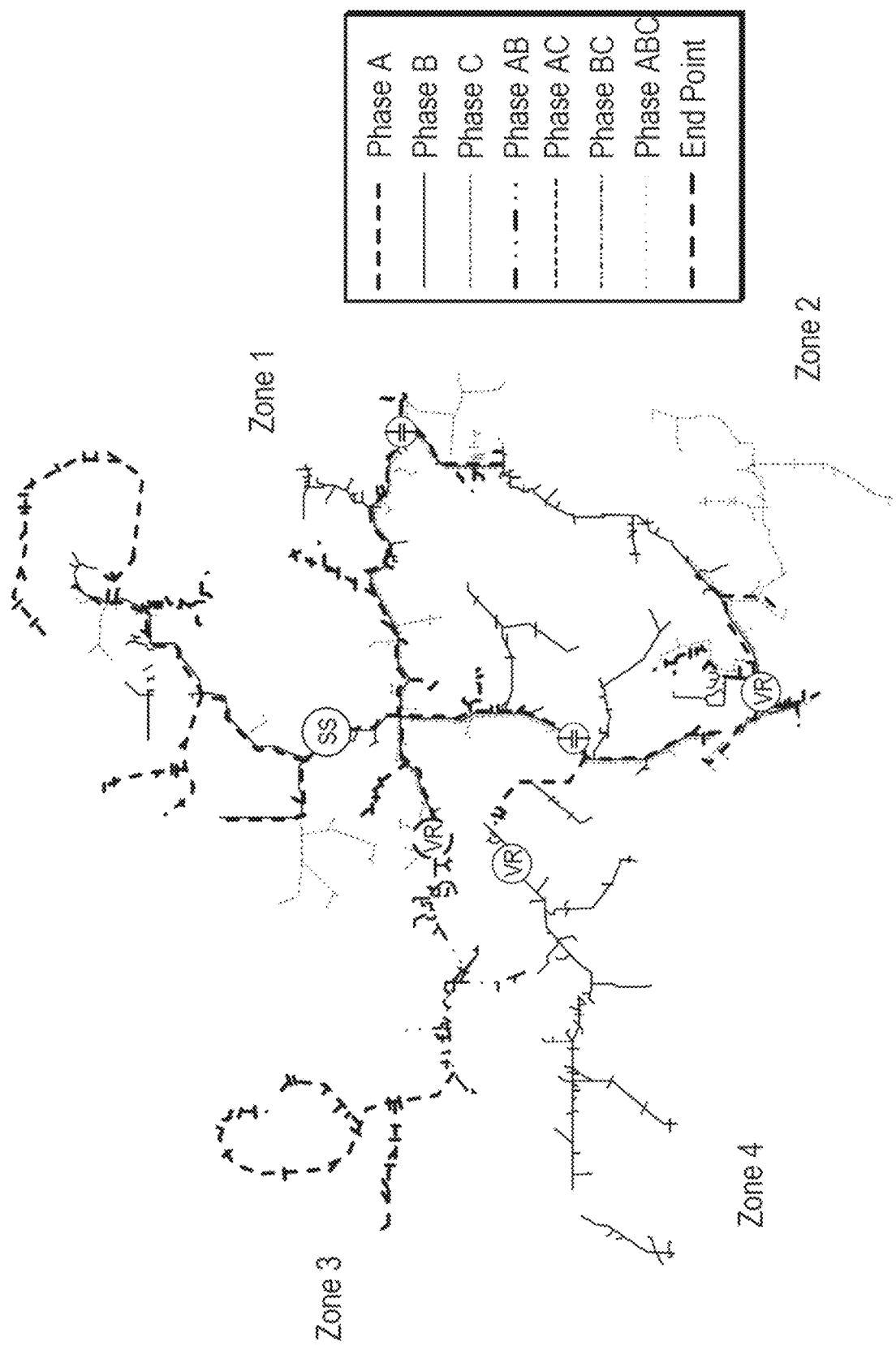
FIG. 27 illustrates an example field network, in accordance with various embodiments of the present disclosure.

FIG. 27 illustrates an example field network, in accordance with various embodiments of the present disclosure. This network includes a 12.47 kV L-L system; a peak MW of about 6.04; three feeders; two three phase capacitor banks with a total MVAR of about 0.6; one three-phase substation voltage regulator with a setpoint voltage of about 126V±1V; two one phase line voltage regulator with a setpoint voltage of about 126V±1V; one three phase LVR with a setpoint voltage of about 126V±1V; a maximum length from substations is about 9.48 miles; and about 1,134 transformers.

The network may include four zones, which are examples of control zones discussed above. Zone 1 may have a load of about 5 1\4 W with a load percentage of about 77.8% with twenty-nine GEDs. Zone 2 may have a load of about 0.63 1\4 W with a load percentage of about 9.8% with three GEDs. Zone 3 may have a load of about 0.5 MW with a load percentage of about 7.8% with two GEDs. Zone 4 may have a load of about MW with a load percentage of about 4.6% with one GED.

Figure 28:
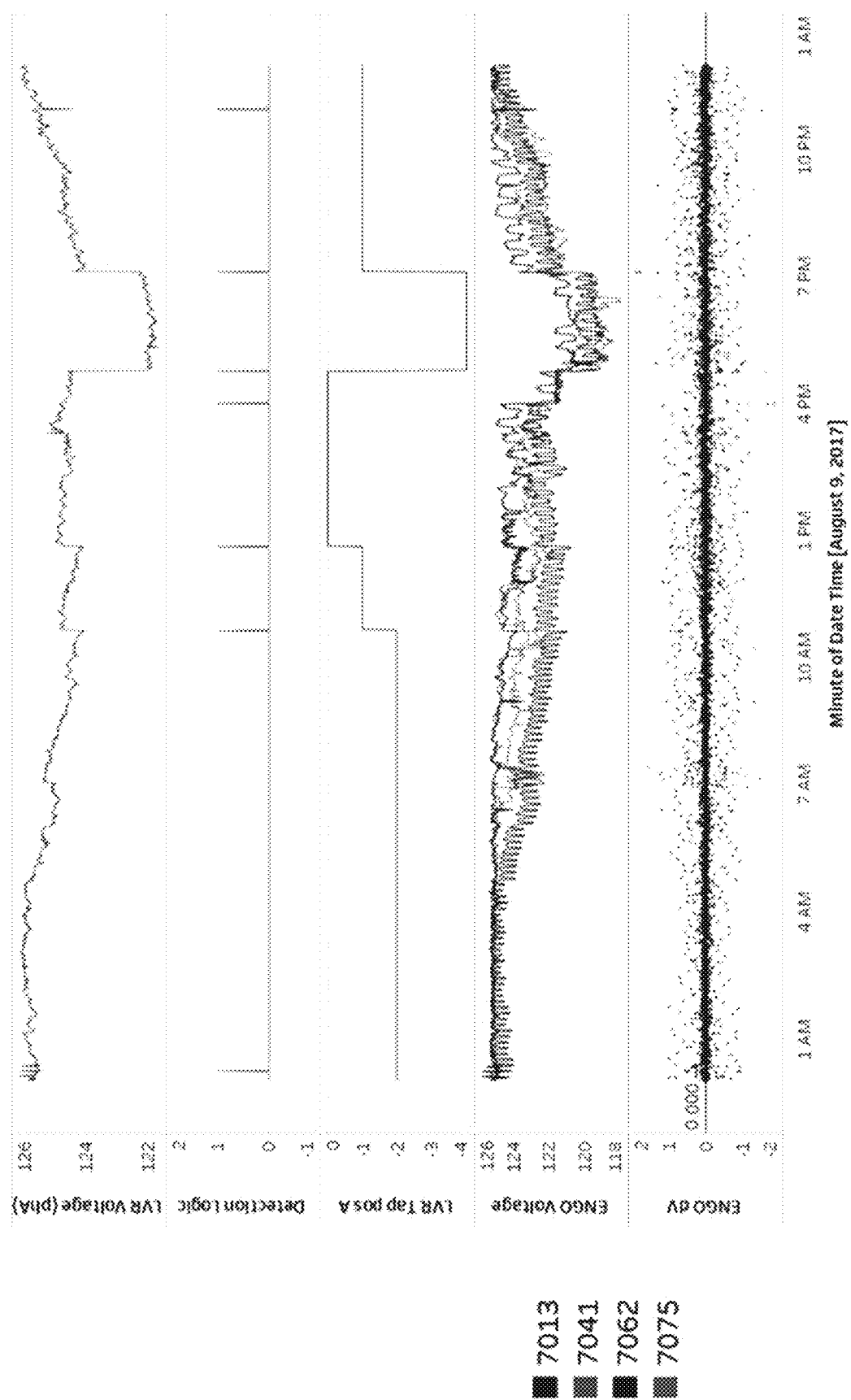
FIG. 28 illustrates the detection of system events in a single day using field data, in accordance with various embodiments of the present disclosure.

FIG. 28 illustrates the detection of system events in a single day using field data, in accordance with various embodiments of the present disclosure. The graphs illustrate LVR voltage, detections using the presently disclosed technology, LVR tap positions, GED voltage values, and GED voltage change values in one day based on the network illustrated in FIG. 27. As illustrated, seven voltage events are detected in Zone 1 Phase A using the four GEDs with a voltage threshold of 0.5V.

Figure 29:
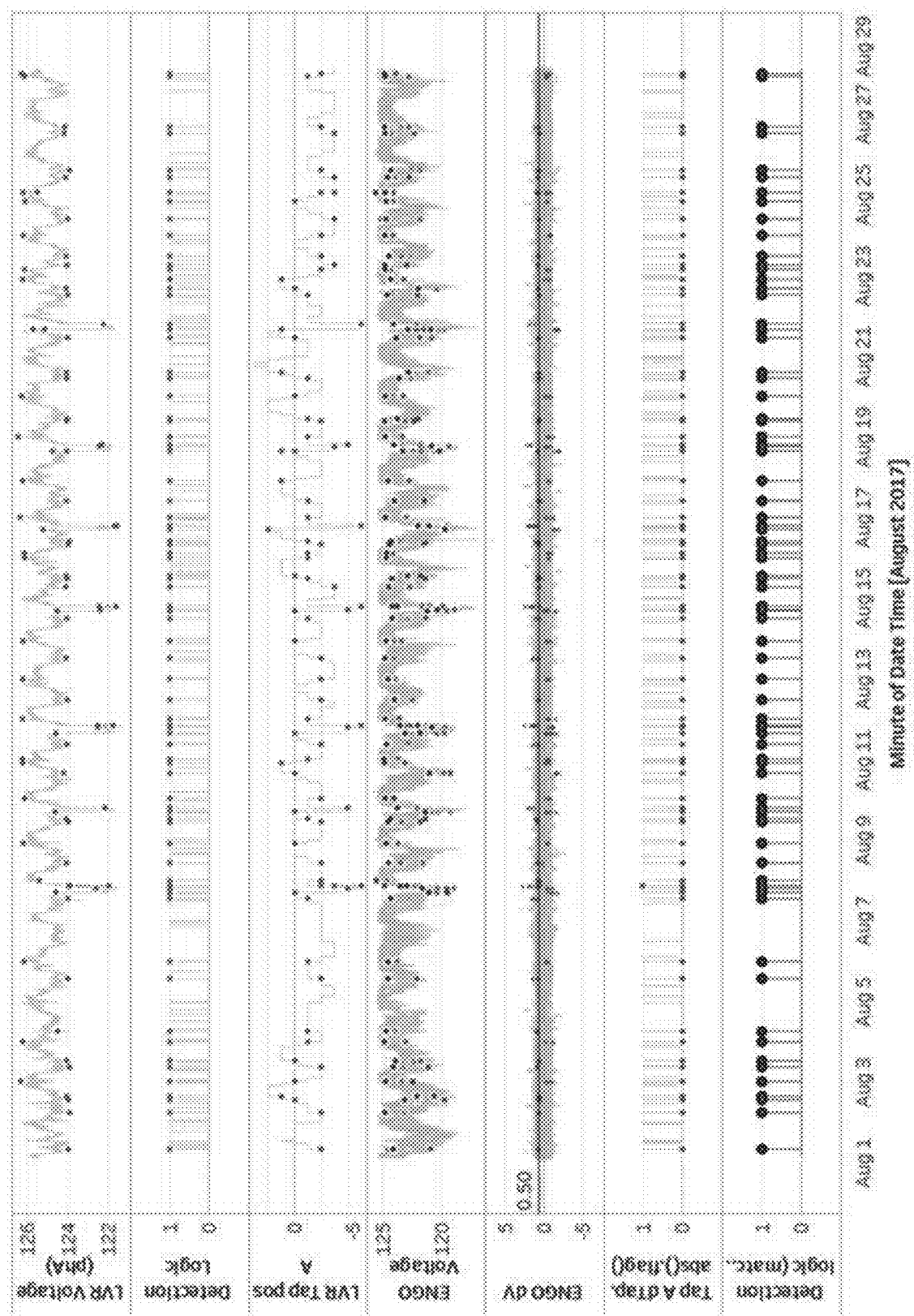
FIG. 29 illustrates the detection of system events over a month using field data, in accordance with various embodiments of the present disclosure.

FIG. 29 illustrates the detection of system events over a month using field data, in accordance with various embodiments of the present disclosure. The graphs illustrate LVR voltage, detections using the presently disclosed technology, LVR tap positions, GED voltage values, GED voltage change values, changes in tap positions, and detection of taps over a month based on the network illustrated in FIG. 27. As illustrated, 199 voltage events are detected using the four GEDs with a voltage threshold of 0.5V. Out of 199 detected events, 111 events are system voltage events. Eighty-eight tap operations are identified out of an actual 167 tap operations, or 53% of the actual tap operations. The presently disclosed technology identified 199 voltage events during the month, which is sufficient in this case to generate a local CVR factor.

Figure 30:
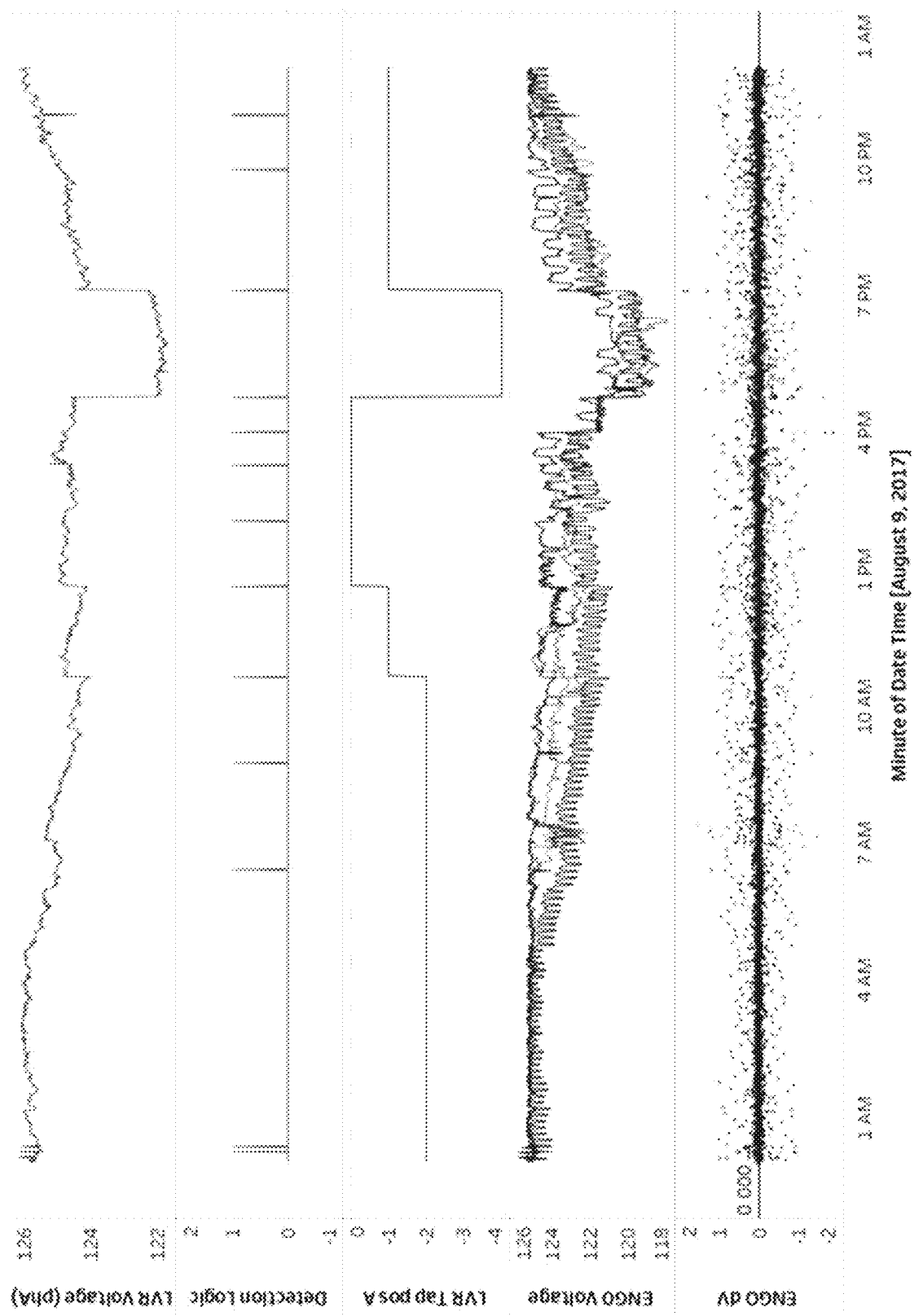
FIG. 30 illustrates the detection of system events with a lower dV threshold in a single day using field data, in accordance with various embodiments of the present disclosure.

FIG. 30 illustrates the detection of system events in a single day using field data, in accordance with various embodiments of the present disclosure. FIG. 30 is substantially similar to, or the same as, FIG. 28 except the voltage threshold used is 0.4V. Using different voltage thresholds, the identified voltage events, identified tap operations, and identified voltage events may change. Increasing the voltage threshold may reduce the number of tap operations detected, while lowering the voltage threshold may inadvertently capture false positives (i.e., voltage events are identified but they are not true voltage events). For example, at a voltage threshold of 0.55V, there are a total of 150 identified voltage events, 71 identified tap operations, and 79 identified system events. At a voltage threshold of 0.5V, there are a total of 199 identified voltage events, 88 identified tap operations, and 111 identified system events. At a voltage threshold of 0.45V, there are a total of 267 identified voltage events, 106 identified tap operations, and 161 identified system events. At a voltage threshold of 0.4V, there are a total of 365 identified voltage events, 128 identified tap operations, and 237 identified system events. At a voltage threshold of 0.5V, 53% of the tap operations may be identified which corresponds to 88 tap operations. This is sufficient to estimate the local CVR factor.

Figure 31:
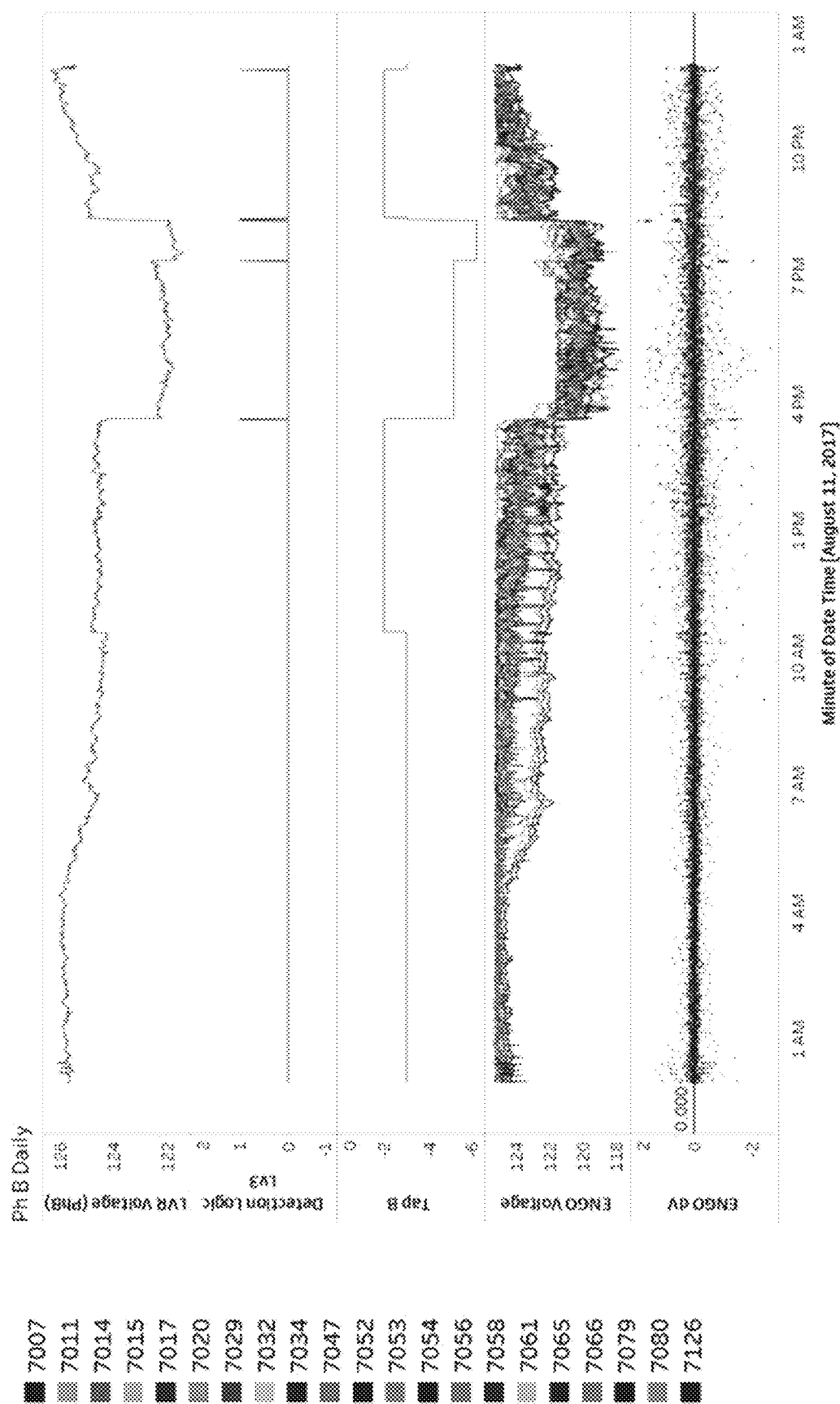
FIG. 31 illustrates the detection of system events in a single day using field data, in accordance with various embodiments of the present disclosure.

FIG. 31 illustrates the detection of system events in a single day using field data, in accordance with various embodiments of the present disclosure. The graphs illustrate LVR voltage, detections using the presently disclosed technology, tap positions, GED voltage values, and GED voltage change values in one day based on the network illustrated in FIG. 27. As illustrated, five voltage events are detected in Zone 1 Phase B using the twenty-one GEDs with a voltage threshold of 0.5V.

Figure 32:
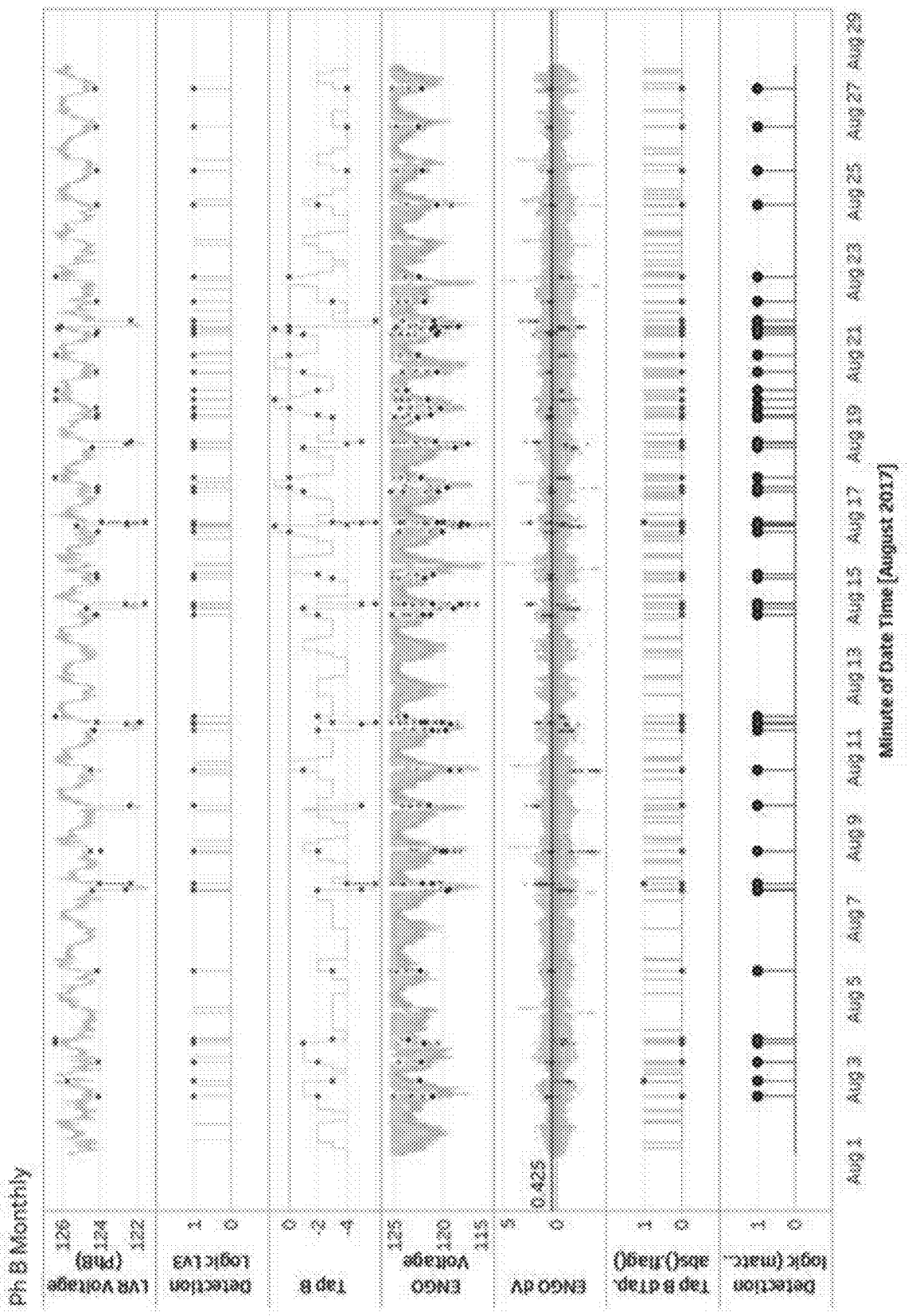
FIG. 32 illustrates the detection of system events over a month using field data, in accordance with various embodiments of the present disclosure.

FIG. 32 illustrates the detection of system events over a month using field data, in accordance with various embodiments of the present disclosure. The graphs illustrate LVR voltage, detections using the presently disclosed technology, tap positions, GED voltage values, GED voltage change values, changes in tap positions, and detection of taps over a month based on the network illustrated in FIG. 27. As illustrated, 126 voltage events are detected using the twenty-one GEDs with a voltage threshold of 0.5V. Out of 126 detected events, 57 events are system events. Sixty-nine tap operations are identified out of an actual 163 tap operations, or 42% of the actual tap operations. The presently disclosed technology identified 126 voltage events during the month, which is sufficient in this case to generate a local CVR factor.

Figure 33:
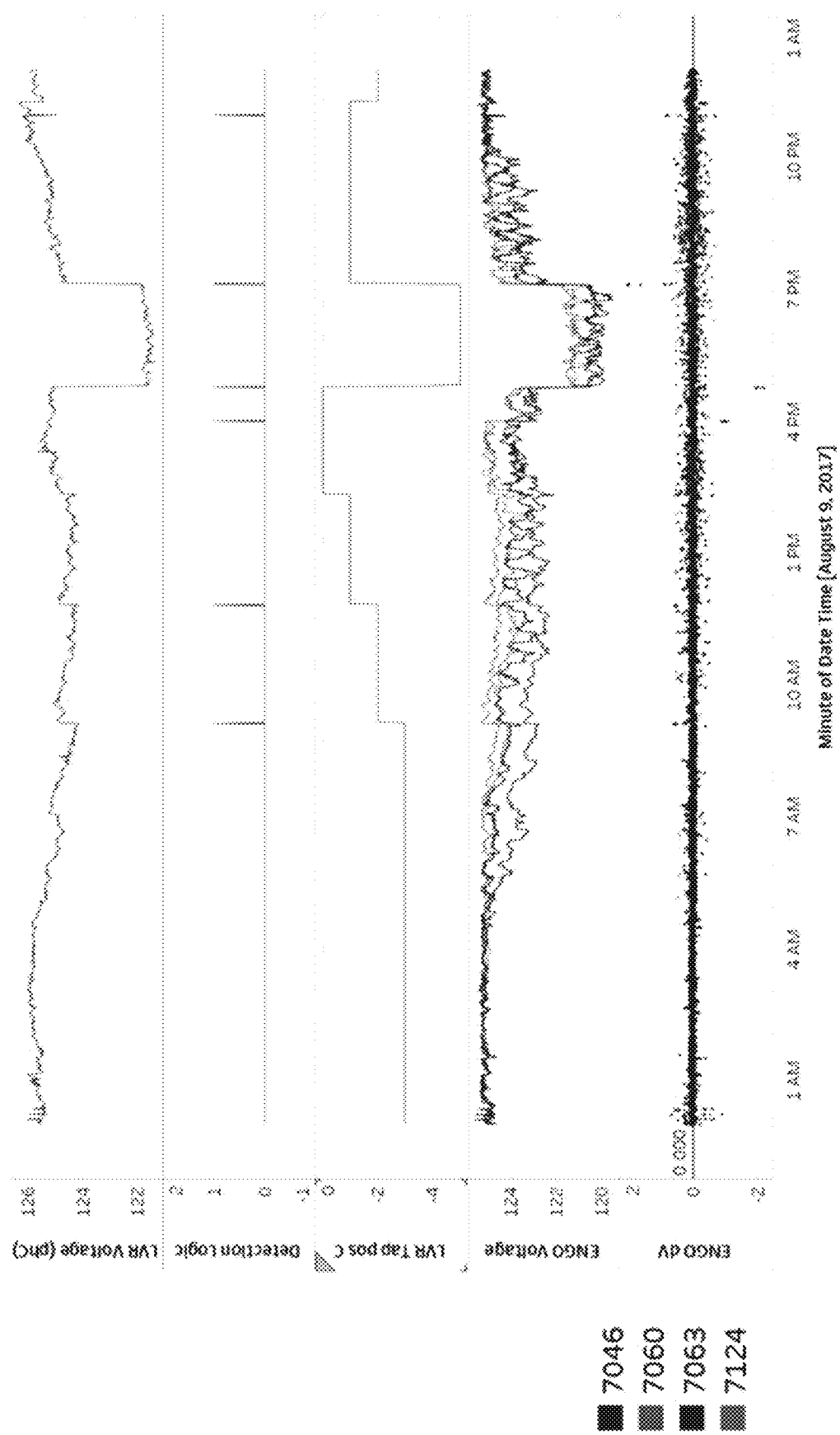
FIG. 33 illustrates the detection of system events in a single day using field data, in accordance with various embodiments of the present disclosure.

FIG. 33 illustrates the detection of system events in a single day using field data, in accordance with various embodiments of the present disclosure. The graphs illustrate LVR voltage, detections using the presently disclosed technology, tap positions, GED voltage values, and GED voltage change values in one day based on the network illustrated in FIG. 27. As illustrated, six voltage events are detected in Zone 1 Phase C using the four GEDs with a voltage threshold of 0.5V.

Figure 34:
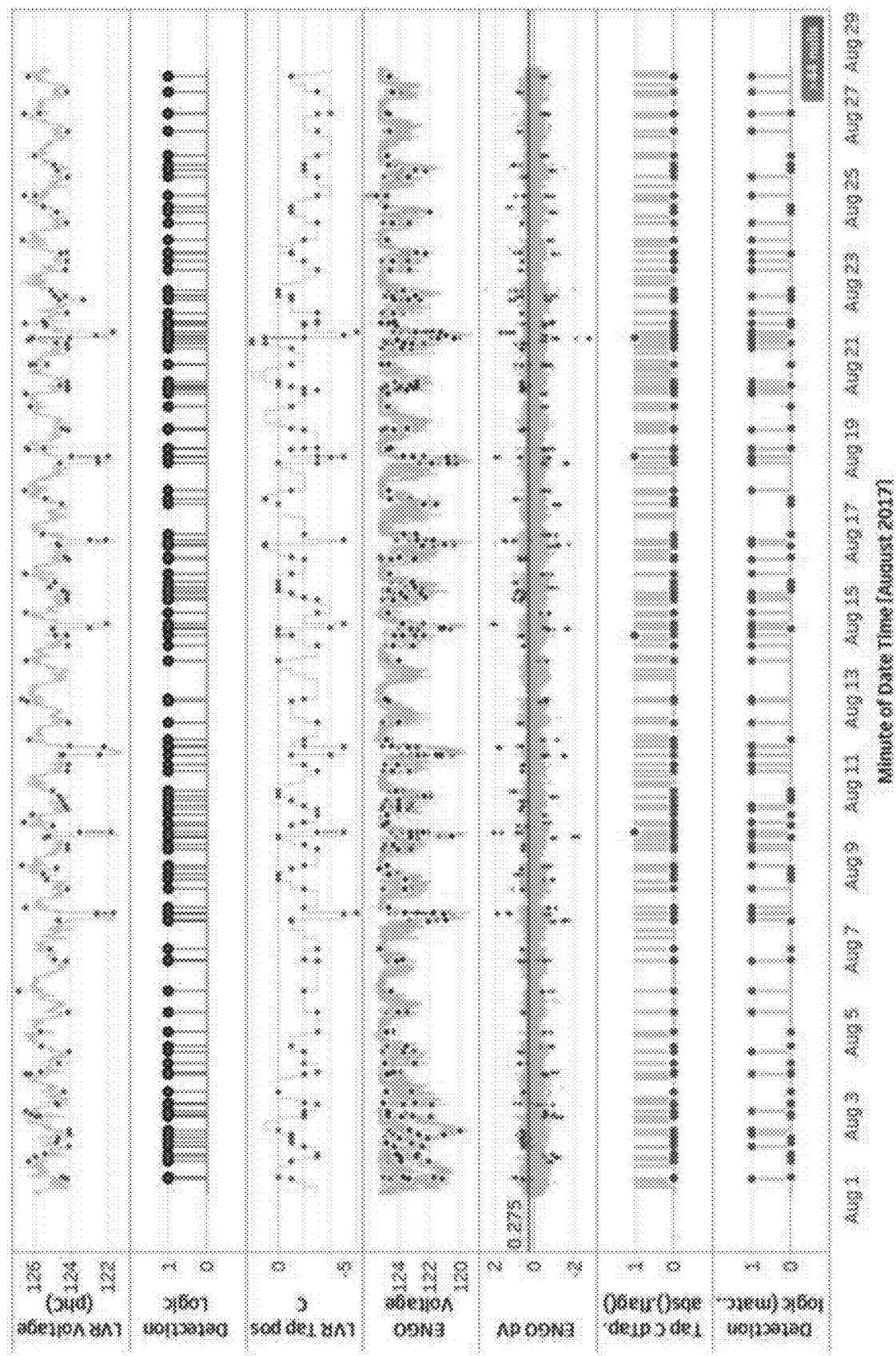
FIG. 34 illustrates the detection of system events over a month using field data, in accordance with various embodiments of the present disclosure.

FIG. 34 illustrates the detection of system events over a month using field data, in accordance with various embodiments of the present disclosure. The graphs illustrate LVR voltage, detections using the presently disclosed technology, LVR tap positions, GED voltage values, GED voltage change values, changes in tap positions, and detection of taps over a month based on the network illustrated in FIG. 27. As illustrated, 150 voltage events are detected using the four GEDs with a voltage threshold of 0.5V.Out of 150 detected events, 62 are system voltage events. Eighty-eight tap operations are identified out of an actual 150 tap operations, or 59% of the actual tap operations. The presently disclosed technology identified 150 voltage events during the month, which is sufficient in this case to generate a local CVR factor.

Figure 35:
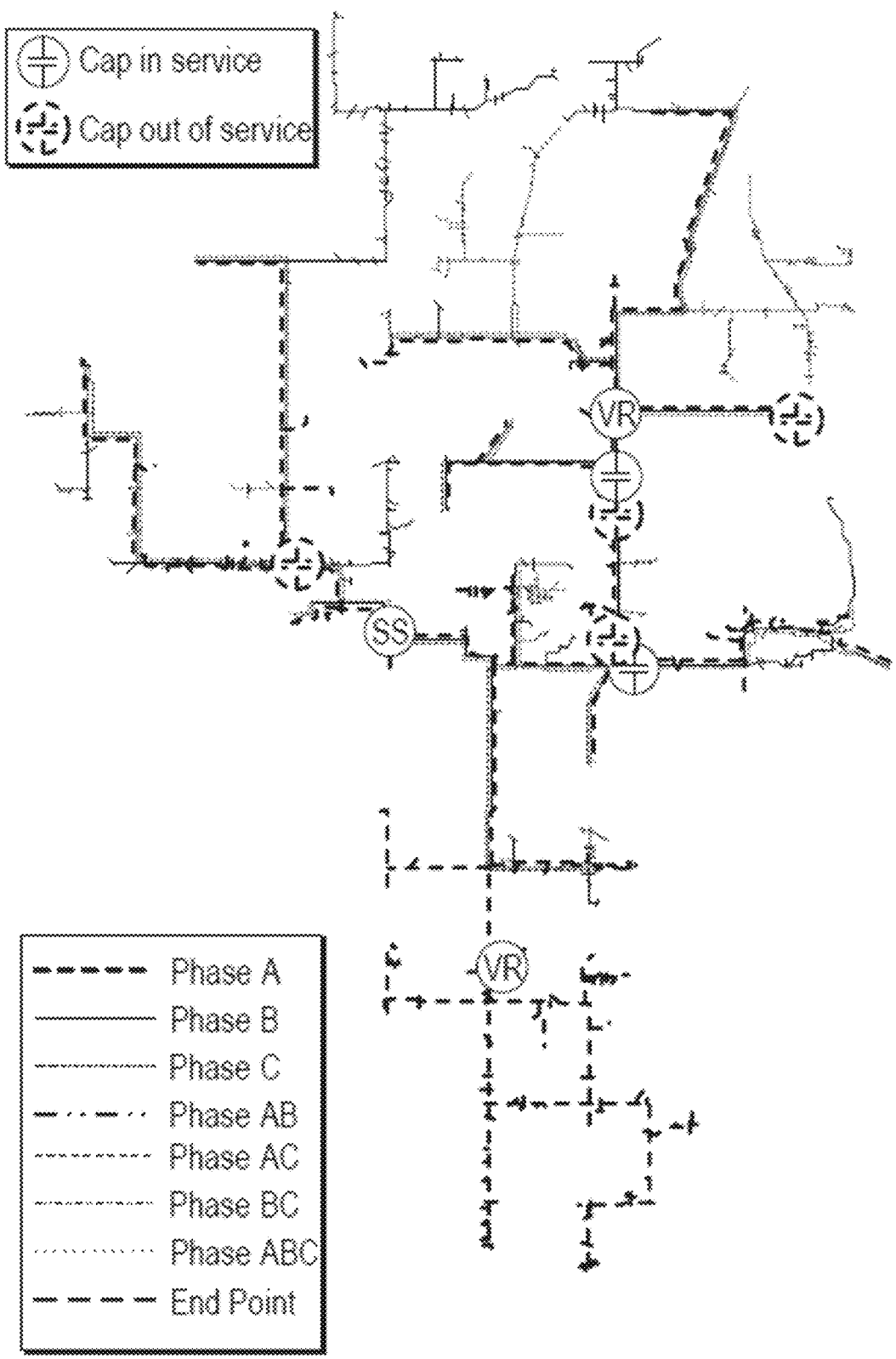
FIG. 35 illustrates an example field network, in accordance with various embodiments of the present disclosure.

FIG. 35 illustrates an example field network, in accordance with various embodiments of the present disclosure. This network includes a 12.47 kV L-L, Peak load of 5.23 MW with PF=87 (lagging); two feeders; three voltage regulators; one substation voltage regulator with a setpoint of about 126±1V, one three phase voltage regulator with a setpoint voltage of about 126V±1V and a single phase voltage regulator with a setpoint voltage of about 126V±1V; six capacitor banks with 2 in service at 600 kVARs and 4 out of service; a maximum length from the substations being about 11 miles; and about 558 transformers serving about 692 customers.

Figure 36:
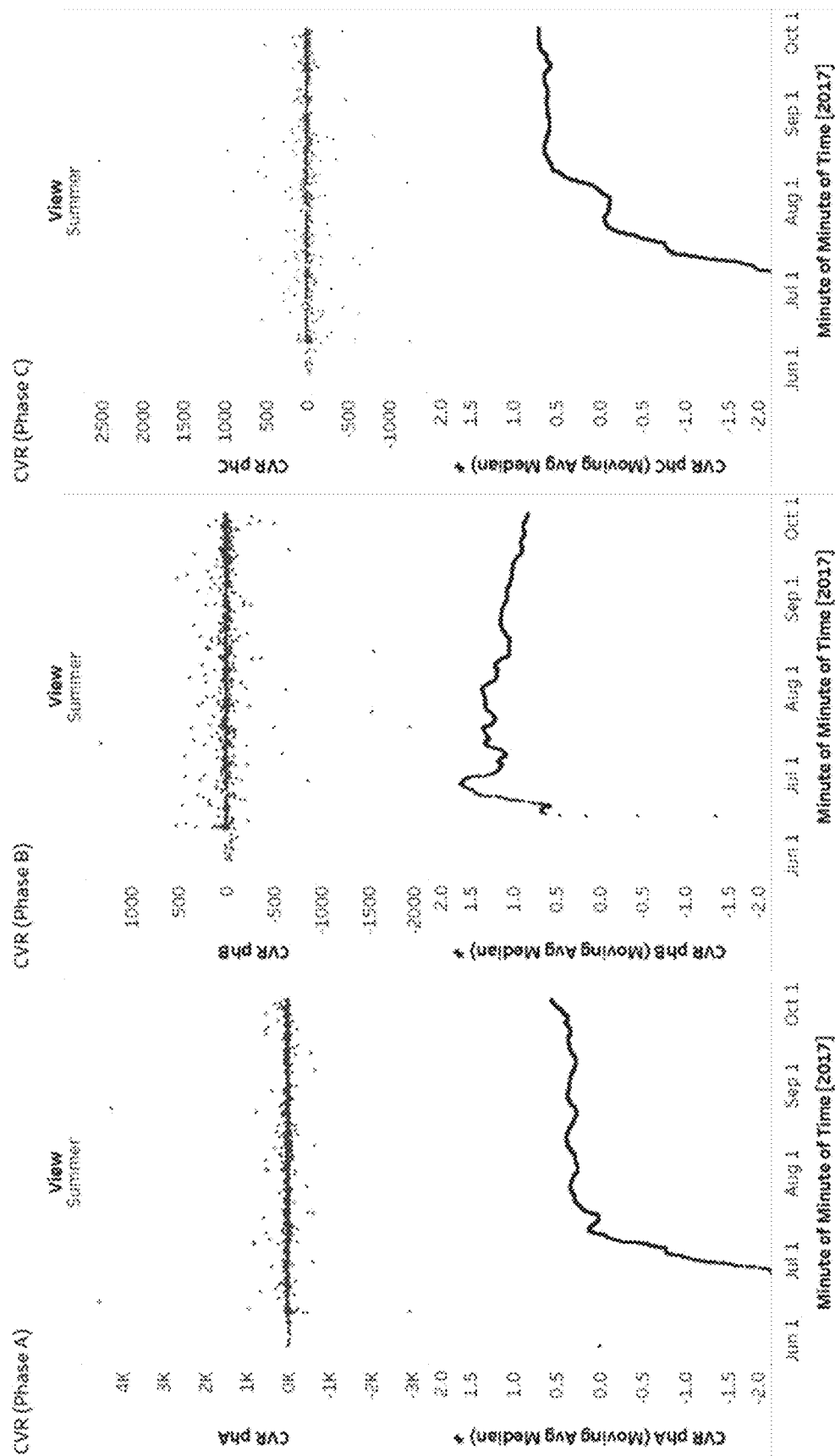
FIG. 36 illustrates the detection of system events and the local CVR over months using field data, in accordance with various embodiments of the present disclosure.

FIG. 36 illustrates the detection of system events and the local CVR factor calculation over months using field data measured at the substation voltage regulator data on the network illustrated in FIG. 35, in accordance with various embodiments of the present disclosure. The graphs illustrate GED CVR factors for the three phases during summer, and the CVR moving average median for the three phases during summer. The load percentage is about 38% for phase A, about 29.6% for Phase B, and about 32.4% for Phase C. The number of LVR events is about 913 for Phase A, about 842 for Phase B, and about 862 for Phase C. The local CVR factor is about 0.56 for Phase A, about 0.82 for Phase B, and about 0.71 for Phase C, with an overall CVR factor of about 0.69.

Figure 37:
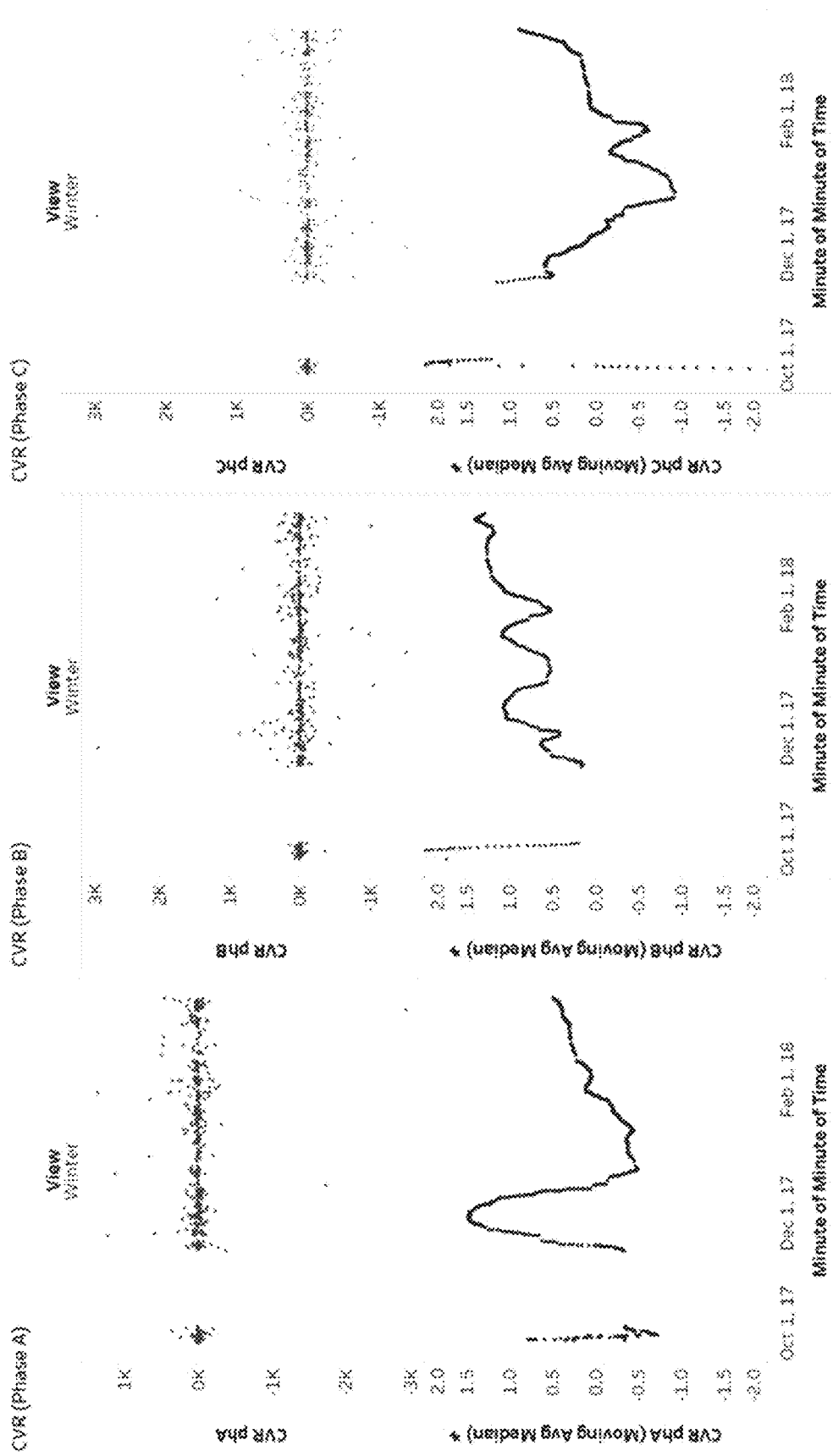
FIG. 37 illustrates the detection of system events and the local CVR over months using field data, in accordance with various embodiments of the present disclosure.

FIG. 37 illustrates the detection of system events and the local CVR factor calculation over months using field data measured at the substation voltage regulator data on the network illustrated in FIG. 35, in accordance with various embodiments of the present disclosure. The graphs illustrate GED CVR factors for the three phases during winter, and the CVR moving average median for the three phases during winter. The load percentage is about 38% for phase A, about 29.6% for Phase B, and about 32.4% for Phase C. The number of LVR events is about 512 for Phase A, about 492 for Phase B, and about 468 for Phase C. The local CVR factor is about 0.49 for Phase A, about 1.29 for Phase B, and about 0.89 for Phase C, with an overall CVR factor of about 0.86.

Figure 38:
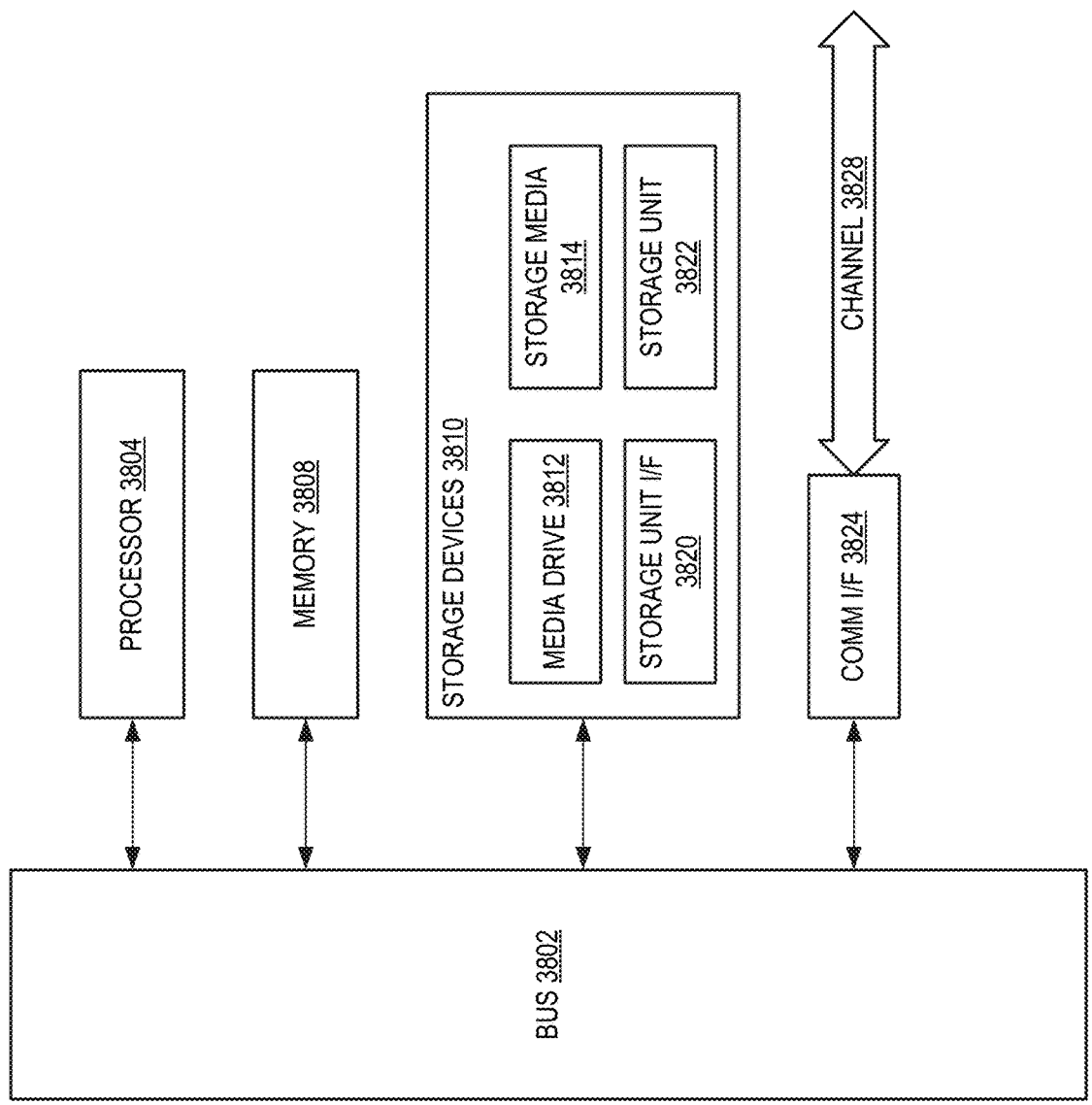
FIG. 38 illustrates an example computing component that may be used to implement features of various embodiments of the disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the application are implemented in whole or in part using software, in one embodiment, these software elements can be implemented to operate with a computing or processing component capable of carrying out the functionality described with respect thereto. One such example computing component is shown in FIG. 38 which may be used to implement various features of the system and methods disclosed herein. Various embodiments are described in terms of this example-computing component 3800. After reading this description, it will become apparent to a person skilled in the relevant art how to implement the application using other computing components or architectures.

Referring now to FIG. 38, computing component 3800 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. For example, computing component 3800 may be one embodiment of the data acquisition and control component of FIG. 38, a GED (such as GEDs 118, 120, 122) and/or SCADA 150 and/or one or more functional elements thereof. Computing component 3800 might also represent computing capabilities embedded within or otherwise available to a given device. For example, a computing component might be found in other electronic devices such as, for example navigation systems, portable computing devices, and other electronic devices that might include some form of processing capability.

Computing component 3800 might include, for example, one or more processors, controllers, control components, or other processing devices, such as a processor 3804. Processor 3804 might be implemented using a general-purpose or special-purpose processing engine such as, for example, a microprocessor, controller, or other control logic. In the illustrated example, processor 3804 is connected to a bus 3802, although any communication medium can be used to facilitate interaction with other components of computing component 3800 or to communicate externally.

Computing component 3800 might also include one or more memory components, simply referred to herein as main memory 3808. For example, preferably random access memory (RAM) or other dynamic memory might be used for storing information and instructions to be executed by processor 3804. Main memory 3808 might also be used for storing temporary variables or other intermediate information during execution of instructions to be executed by processor 3804. Computing component 3800 might likewise include a read only memory ("ROM") or other static storage device coupled to bus 3802 for storing static information and instructions for processor 3804.

The computing component 3800 might also include one or more various forms of storage device 3810, which might include, for example, a media drive 3812 and a storage unit interface 3820. The media drive 3812 might include a drive or other mechanism to support fixed or removable storage media 3814. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 3814 might include, for example, a hard disk, an integrated circuit assembly, magnetic tape, cartridge, optical disk, a CD or DVD, or other fixed or removable medium that is read by, written to or accessed by media drive 3812. As these examples illustrate, the storage media 3814 can include a computer usable storage medium having stored therein computer software or data.

In alternative embodiments, storage device 3810 might include other similar instrumentalities for allowing computer programs or other instructions or data to be loaded into computing component 3800. Such instrumentalities might include, for example, a fixed or removable storage unit 3822 and an interface 3820. Examples of such storage units 3822 and interfaces 3820 can include a program cartridge and cartridge interface, a removable memory (for example, a flash memory or other removable memory component) and memory slot, a PCMCIA slot and card, and other fixed or removable storage units 3822 and interfaces 3820 that allow software and data to be transferred from the storage unit 3822 to computing component 3800. Data required to implement one or more of the above-discussed processes 200, 1000, 2300, 2400, and/or 2500 may be stored within storage device 3810, and accessed as necessary to implement said process(es).

Computing component 3800 might also include a communications interface 3824. Communications interface 3824 might be used to allow software and data to be transferred between computing component 3800 and external devices. Examples of communications interface 3824 might include a modem or softmodem, a network interface (such as an Ethernet, network interface card, WiMedia, IEEE 802.XX or other interface), a communications port (such as for example, a USB port, IR port, RS382 port Bluetooth® interface, or other port), or other communications interface. Software and data transferred via communications interface 3824 might typically be carried on signals, which can be electronic, electromagnetic (which includes optical) or other signals capable of being exchanged by a given communications interface 3824. These signals might be provided to communications interface 3824 via a channel 3828. This channel 3828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 3808, storage unit 3820, media 3814, and channel 3828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 3800 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time interval or to an item available as of a given time, but instead should be read to encompass conventional, traditional, normal, or standard technologies that may be available or known now or at any time in the future. Similarly, specific values may be listed though it should be appreciated that these are approximate and not exact. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for determining a local conservative voltage reduction (CVR) factor using grid edge devices (GEDs), the computer-implemented method being implemented in a computer system comprising a non-transitory storage medium and one or more processors, the computer-implemented method comprising:
   receiving, from each of the GEDs, respective voltage change values and power change values;
   identifying, using the processor, voltage events within at least one control zone, each of the GEDs being associated with a zone of the at least one control zone, the voltage events being identified based at least in part on the GEDs in the zones meeting one or more event parameters, wherein identifying the voltage events further comprises:
   for each control zone having more than a threshold number of GEDs associated therewith, determining if the respective voltage change values of a subset of the GEDs within the given control zone and within a similar period based at least in part on a location of each GED, exceed a voltage threshold, the subset being less than all of the GEDs within the given control zone;
   identifying a plurality of CVR values for each GED, each CVR value being based at least in part on one of the respective voltage change values and one of the power change values associated with each identified voltage event;
   generating, using the processor and based at least in part on the plurality of CVR values, a local CVR factor for each GED; and,
   controlling one or more devices based at least in part on the local CVR factor.

2. The method of claim 1, further comprising arranging, using the one or more processors, the GEDs into the one or more control zones based at least in part on a network parameter.

3. The method of claim 2, the network parameter being gang operated.

4. The method of claim 2, the network parameter being a phase associated with the GED.

5. The method of claim 2, the network parameter including a plurality of network parameters, at least some of the one or more control zones being based at least in part on different ones of the plurality of network parameters.

6. The method of claim 1, the subset indicating at least 80% of a number of GEDs in the given control zone.

7. The method of claim 1, the threshold number of GEDs being six.

8. The method of claim 1, the voltage threshold being 0.5 V.

9. The method of claim 1, the determining if the respective voltage change values exceed the voltage threshold comprising:
determining a median voltage change value based at least in part on absolute values of the respective voltage change values, and determining if the median voltage change value exceeds the voltage threshold.

10. The method of claim 1, the identifying the plurality of CVR values including determining an optimal window size, the optimal window size defining which of the received respective voltage change values and received power change values are to be used in generating the local CVR factor.

11. The method of claim 10, the determining an optimal window size comprising:
obtaining the received power change values within a time period;
calculating total samples value defined by a total number of power change values obtained;
calculating target samples value defined by a total number of the obtained power change values within plus or minus a target threshold;
calculating a percentage of target samples value to the total samples value; and
calculating the optimal window size as a number of events around a zero median divided by the percentage of target samples.

12. The method of claim 11, the number of events around a zero median being selected as eight.

13. The method of claim 11, the target threshold being 0.625% from zero.

14. The method of claim 10, the determining an optimal window size comprising:
recalculating the optimal window size for each GED after expiration of a refresh period.

15. A computer-implemented method for determining a local conservative voltage reduction (CVR) factor using grid edge devices (GEDs), the computer-implemented method being implemented in a computer system comprising a non-transitory storage medium and one or more processors, the computer-implemented method comprising:
receiving, from each of the GEDs, respective voltage change values and power change values;
identifying, using the processor, voltage events within at least one control zone, each of the GEDs being associated with a zone of the at least one control zone, the voltage events being identified based at least in part on the GEDs in the zones meeting one or more event parameters;
identifying a plurality of CVR values for each GED, each CVR value being based at least in part on one of the respective voltage change values and one of the power change values associated with each identified voltage event;
generating, using the processor and based at least in part on the plurality of CVR values, a local CVR factor for each GED, wherein generating the local CVR factor further comprises:
collecting a list of historical CVR values within a window;
determining moving median CVR factors for the CVR values within the list until a threshold number of determined moving median CVR factors reaches a moving average size; and
determining the local CVR factor as an average of the moving median CVR factors; and
controlling one or more devices based at least in part on the local CVR factor.

16. The method of claim 15, the moving average size being 30 samples.

17. A computer-implemented method for determining a local conservative voltage reduction (CVR) factor using grid edge devices (GEDs), the computer-implemented method being implemented in a computer system comprising a non-transitory storage medium and one or more processors, the computer-implemented method comprising:
receiving, from each of the GEDs, respective voltage change values and power change values;
identifying, using the processor, voltage events within at least one control zone, each of the GEDs being associated with a zone of the at least one control zone, the voltage events being identified based at least in part on the GEDs in the zones meeting one or more event parameters;
identifying a plurality of CVR values for each GED, each CVR value being based at least in part on one of the respective voltage change values and one of the power change values associated with each identified voltage event;
identifying a plurality of moving median CVR factors for each GED based at least in part on the plurality of CVR values;
generating, using the processor and based at least in part on the moving median CVR factors, a local CVR factor for each GED; and,
controlling one or more devices based at least in part on the local CVR factor.

18. The method of claim 17, the identifying voltage events comprising: for each control zone having more than a threshold number of GEDs associated therewith, determining if the respective voltage change values of a subset of the GEDs within the given control zone and within a similar period based at least in part on a location of each GED, exceed a voltage threshold, the subset being less than all of the GEDs within the given control zone.

19. The method of claim 17, the identifying the plurality of CVR values including determining an optimal window size, the optimal window size defining which of the received respective voltage change values and received power change values are to be used in generating the local CVR factor, the determining an optimal window size comprising:
obtaining the received power change values within a time period;
calculating total samples value defined by a total number of power change values obtained;
calculating target samples value defined by a total number of the obtained power change values within plus or minus a target threshold;
calculating a percentage of target samples value to the total samples value; and
calculating the optimal window size as a number of events around a zero median divided by the percentage of target samples.

20. The method of claim 17, further comprising arranging, using the processor, the GEDs into the one or more control zones based at least in part on a network parameter.

* * * * *